United States Patent
Bauder et al.

(10) Patent No.: US 9,705,537 B1
(45) Date of Patent: Jul. 11, 2017

(54) SPLIT LOW NOISE AMPLIFIER

(75) Inventors: Ruediger Bauder, Feldkirchen-Westerham (DE); Nadim Khlat, Midi-Pyrenees (FR); Todd Gillenwater, Summerfield, NC (US); Bob Sowell, Greensboro, NC (US)

(73) Assignee: Qorvo US, Inc., Greensboro, NC (US)

( * ) Notice: Subject to any disclaimer, the term of this patent is extended or adjusted under 35 U.S.C. 154(b) by 713 days.

(21) Appl. No.: 12/563,679

(22) Filed: Sep. 21, 2009

Related U.S. Application Data

(60) Provisional application No. 61/098,556, filed on Sep. 19, 2008.

(51) Int. Cl.
*H04B 1/10* (2006.01)
*H04B 1/16* (2006.01)
*H04B 1/04* (2006.01)

(52) U.S. Cl.
CPC ............. *H04B 1/0458* (2013.01); *H04B 1/16* (2013.01)

(58) Field of Classification Search
CPC ...... H04B 1/30; H04B 1/1036; H04B 1/7101; H03H 11/04; H04W 52/0238; H04W 52/0245; H01Q 1/247
USPC ............................................... 455/552.1, 293
See application file for complete search history.

(56) References Cited

U.S. PATENT DOCUMENTS

| | | | |
|---|---|---|---|
| 2004/0192392 A1* | 9/2004 | Hoppenstein | H01Q 1/1242 455/562.1 |
| 2005/0197095 A1* | 9/2005 | Nakamata et al. | 455/403 |
| 2007/0021080 A1* | 1/2007 | Kuriyama et al. | 455/132 |
| 2007/0042802 A1* | 2/2007 | Park et al. | 455/552.1 |
| 2008/0299921 A1* | 12/2008 | Liao | 455/115.3 |
| 2009/0227273 A1* | 9/2009 | McCune, Jr. | 455/466 |

OTHER PUBLICATIONS

Krishnamurthy, Gautham et al., "Integrated Time Division Multiplexing Front-End Circuit for Multi-Antenna RF Receivers," 2008 IEEE Radio Frequency Integrated Circuits Symposium, 2008, pp. 351-354, IEEE.

Capovilla, C. E. et al., A CMOS Low Noise Amplifier at 2.5GHz Band with Multiple Switched Inputs for SMILE Array Receiver Application, Proceedings of Asia-Pacific Microwave Conference 2007, Dec. 11-14, 2007, pp. 1-4, IEEE.

(Continued)

*Primary Examiner* — Allahyar Kasraian
(74) *Attorney, Agent, or Firm* — Withrow & Terranova, P.L.L.C.

(57) ABSTRACT

Embodiments of the present disclosure relate to a multi-mode RF system, which is capable of transmitting and receiving RF signals using any of multiple RF communications bands. The multi-mode RF system may integrate RF band specific bandpass filters and low noise amplifiers (LNAs) into a single front-end module, such that each filter and amplifier pair provide selection and gain for at least one RF communications band. Outputs of the LNAs may be combined to provide one or more common signals to a transceiver module, which processes baseband signals associated with the RF communications bands. By integrating the filters and amplifiers into a single module, the filters and amplifiers may be closely coupled to one another, thereby supporting short signal paths between the filters and amplifiers, and having impedances high enough to provide good filter selectivity.

17 Claims, 15 Drawing Sheets

(56) References Cited

OTHER PUBLICATIONS

Yoo, Sang-Sun et al., "A Low Power Current-reused CMOS RF Front-end with Stacked LNA and Mixer," 2007 Topical Meeting on Silicon Monolithic Integrated Circuits in RF Systems, Jan. 10-12, 2007, pp. 103-106, IEEE.

Hueber, Gernot et al., "An Adaptive Multi-Mode RF Front-End for Cellular Terminals," 2008 IEEE Radio Frequency Integrated Circuits Symposium, Apr. 17-Jun. 17, 2008, pp. 25-28, IEEE.

Saleh, Sherif A. et al., "A Comparative Study of CMOS LNAs," 18th European Conference on Circuit Theory and Design, Aug. 27-30, 2007, pp. 76-79, IEEE.

\* cited by examiner

SPLIT LOW NOISE AMPLIFIER

This application claims the benefit of provisional patent application Ser. No. 61/098,556, filed Sep. 19, 2008, the disclosure of which is hereby incorporated herein by reference in its entirety.

FIELD OF THE DISCLOSURE

Embodiments of the present disclosure relate to multi-mode radio frequency (RF) transceivers and related devices and systems.

BACKGROUND OF THE DISCLOSURE

As wireless technology progresses, communications devices are becoming increasingly integrated and sophisticated. As a result, multi-mode wireless devices are routinely available. A multi-mode wireless device is capable of wireless communications using any of two or more RF communications band. Typically, each RF communications band may be associated with its own RF communications protocol. A multi-mode wireless device may be useful because it is a single communications device that may be used with any of multiple communications networks. Additionally, the multi-mode wireless device may be highly integrated, thereby reducing size, cost, or both FIG. 1 shows a traditional multi-mode wireless communications device 10 according to the prior art. The traditional multi-mode wireless communications device 10 is coupled to an RF antenna 12, which is used for transmitting and receiving wireless signals. The traditional multi-mode wireless communications device 10 includes a traditional multi-mode front-end module 14, a multi-mode filter module 16, and a traditional multi-mode transceiver module 18. The traditional multi-mode transceiver module 18 may be highly integrated by combining RF and digital functions into a single module. As such, the traditional multi-mode transceiver module 18 may provide baseband processing, RF modulation to create RF signals for transmission, low noise amplification for amplifying low level received RF signals, and down conversion. The traditional multi-mode front-end module 14 is coupled between the RF antenna 12 and the multi-mode filter module 16. A first bi-directional RF signal 20, a second bi-directional RF signal 22, and up to and including an $M^{TH}$ bi-directional RF signal 24 may be used to transfer RF information between the RF antenna 12 and the multi-mode filter module 16 through the traditional multi-mode front-end module 14. Each of the bi-directional RF signals 20, 22, 24 may be either single-ended or differential.

The traditional multi-mode front-end module 14 provides a first transmit signal 26, a second transmit signal 28, and up to and including an $N^{TH}$ transmit signal 30 to the multi-mode filter module 16, which provides a first RF receive signal 32, a second RF receive signal 34, and up to and including a $P^{TH}$ RF receive signal 36 to the traditional multi-mode transceiver module 18. The traditional multi-mode transceiver module 18 provides a high band RF transmit signal 38 and a low band RF transmit signal 40 to the traditional multi-mode front-end module 14. Each of the transmit signals 26, 28, 30 and the RF receive signals 32, 34, 36 may be either single-ended or differential.

FIG. 2 shows details of the traditional multi-mode wireless communications device 10 illustrated in FIG. 1 according to the prior art. The traditional multi-mode transceiver module 18 includes an RF switch circuit 42 and a power amplifier (PA) circuit 44. The traditional multi-mode transceiver module 18 includes low noise amplifier (LNA) circuitry 46. The RF switch circuit 42 is coupled between the RF antenna 12 and the multi-mode filter module 16. The bi-directional RF signals 20, 22, 24 may be used to transfer RF information between the RF antenna 12 and the multi-mode filter module 16 through the RF switch circuit 42. Each of the bi-directional RF signals 20, 22, 24 may be associated with one or more RF communications band. During RF operation, in which RF signals are transmitted and received using a selected RF communications band, the RF switch circuit 42 may select one of the bi-directional RF signals 20, 22, 24 that is associated with the selected RF communications band. Therefore, the selected bi-directional RF signal, which is associated with the selected RF communications band, is used to transfer RF information between the RF antenna 12 and the multi-mode filter module 16.

As is known in the art, a duplexer is a special type of RF filter having two non-overlapping passbands and may be used to process a combined bi-directional RF signal as separate RF transmit signal and RF receive signals. One passband is a receive passband and the other passband is a transmit passband. Specifically, a duplexer may be used to receive an RF transmit signal within the transmit passband and provide the bi-directional RF signal based on the RF transmit signal, and may be used to simultaneously receive an RF receive signal embedded in the bi-directional RF signal within the receive passband and extract and provide the RF receive signal. Therefore, each duplexer may be associated with a bi-directional RF signal, an RF receive signal, and an RF transmit signal. In one example of the traditional multi-mode wireless communications device 10, the multi-mode filter module 16 has a duplexer for each of the bi-directional RF signals 20, 22, 24 that corresponds to one of the RF receive signals 32, 34, 36 and to one of the RF transmit signals 26, 28, 30. Additionally, each duplexer is associated with an RF communications band. Therefore, each of the RF receive signals 32, 34, 36 and each of the RF transmit signals 26, 28, 30 is associated with an RF communications band. Typically, a duplexer may include a receive bandpass filter and a transmit bandpass filter. However, some duplexers may include a bandpass filter and a low pass filter, or a bandpass filter and a high pass filter. A passband associated with a low pass filter or a high pass filter is very wide and may be problematic in some situations.

The PA circuit 44 has multiple PAs (not shown), such that each PA receives and amplifies either the high band RF transmit signal 38 or the low band RF transmit signal 40 to provide at least one of the RF transmit signals 26, 28, 30. The LNA circuitry 46 has multiple LNAs (not shown), such that each LNA receives and amplifies one of the RF receive signals 32, 34, 36. Therefore, each LNA is associated with one of the RF communications bands. Such an arrangement presents several challenges as presented below.

In systems that support large numbers of RF communications bands, the LNA circuitry 46 has a corresponding large number of LNAs, thereby increasing the complexity and cost of the traditional multi-mode transceiver module 18. Further, each LNA may have associated impedance matching circuitry, thereby further increasing cost and complexity. Each time the traditional multi-mode wireless communications device 10 is revised to support an additional RF communications band, the traditional multi-mode transceiver module 18 must be revised to add an additional LNA and then re-qualified, which is time consuming and costly. If a single traditional multi-mode transceiver module 18 design is used in several different wireless communications device designs, unused LNAs and matching circuits add to the overhead of such designs. Since the RF receive signals 32, 34, 36 traverse two separate modules, namely the multi-mode filter module 16 and the traditional multi-mode transceiver module 18, several signal integrity challenges may exist. First, controlling electrical lengths of signal paths associated with the RF receive signals 32, 34, 36 may by difficult or impossible. As such, RF performance may be compromised. Large numbers of signal paths traversing two separate modules may increase susceptibility to noise, other electrical disturbances, or the like. If the traditional multi-mode wireless communications device 10 is a cell phone or other low cost communications device, the traditional multi-mode transceiver module 18 and the multi-mode filter module 16 may have to be constructed using low cost substrates, which may prohibit the use of high impedance RF lines. Low impedance RF lines on low cost substrates may be lossy, difficult to produce to maintain proper impedances, or both. Thus, there is a need to reduce the shortcomings associated with large numbers of LNAs on a multi-mode transceiver module, to facilitate use of high impedance nodes between RF filters and LNAs, and to reduce or eliminate the shortcomings of routing large numbers of RF receive signals between multiple modules.

SUMMARY OF THE EMBODIMENTS

Embodiments of the present disclosure relate to a multi-mode RF system, which is capable of transmitting and receiving RF signals using any of multiple RF communications bands. The multi-mode RF system may integrate RF band specific bandpass filters and low noise amplifiers (LNAs) into a single front-end module, such that each filter and amplifier pair provide selection and gain for at least one RF communications band. Outputs of the LNAs may be combined to provide one or more common signals to a transceiver module, which processes baseband signals associated with the RF communications bands. By integrating the filters and amplifiers into a single module, the filters and amplifiers may be closely coupled to one another, thereby supporting short signal paths between the filters and amplifiers, and having impedances high enough to provide good filter selectivity. Additionally, by moving the amplifiers away from the digital signals of the transceiver module, coupled noise into the RF receive paths may be reduced, and cost and complexity of the transceiver module may be reduced.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION OF THE PREFERRED EMBODIMENTS

The embodiments set forth below represent the necessary information to enable those skilled in the art to practice the disclosure and illustrate the best mode of practicing the disclosure. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Embodiments of the present disclosure relate to a multi-mode RF system, which is capable of transmitting and receiving RF signals using any of multiple RF communications bands. The multi-mode RF system may integrate RF band specific bandpass filters and low noise amplifiers (LNAs) into a single front-end module, such that each filter and amplifier pair provide selection and gain for at least one RF communications band. Outputs of the LNAs may be combined to provide one or more common signals to a transceiver module, which processes baseband signals associated with the RF communications bands. By integrating the filters and amplifiers into a single module, the filters and amplifiers may be closely coupled to one another, thereby supporting short signal paths between the filters and amplifiers, and having impedances high enough to provide good filter selectivity. Additionally, by moving the amplifiers away from the digital signals of the transceiver module, coupled noise into the RF receive paths may be reduced, and cost and complexity of the transceiver module may be reduced.

Figure 1:
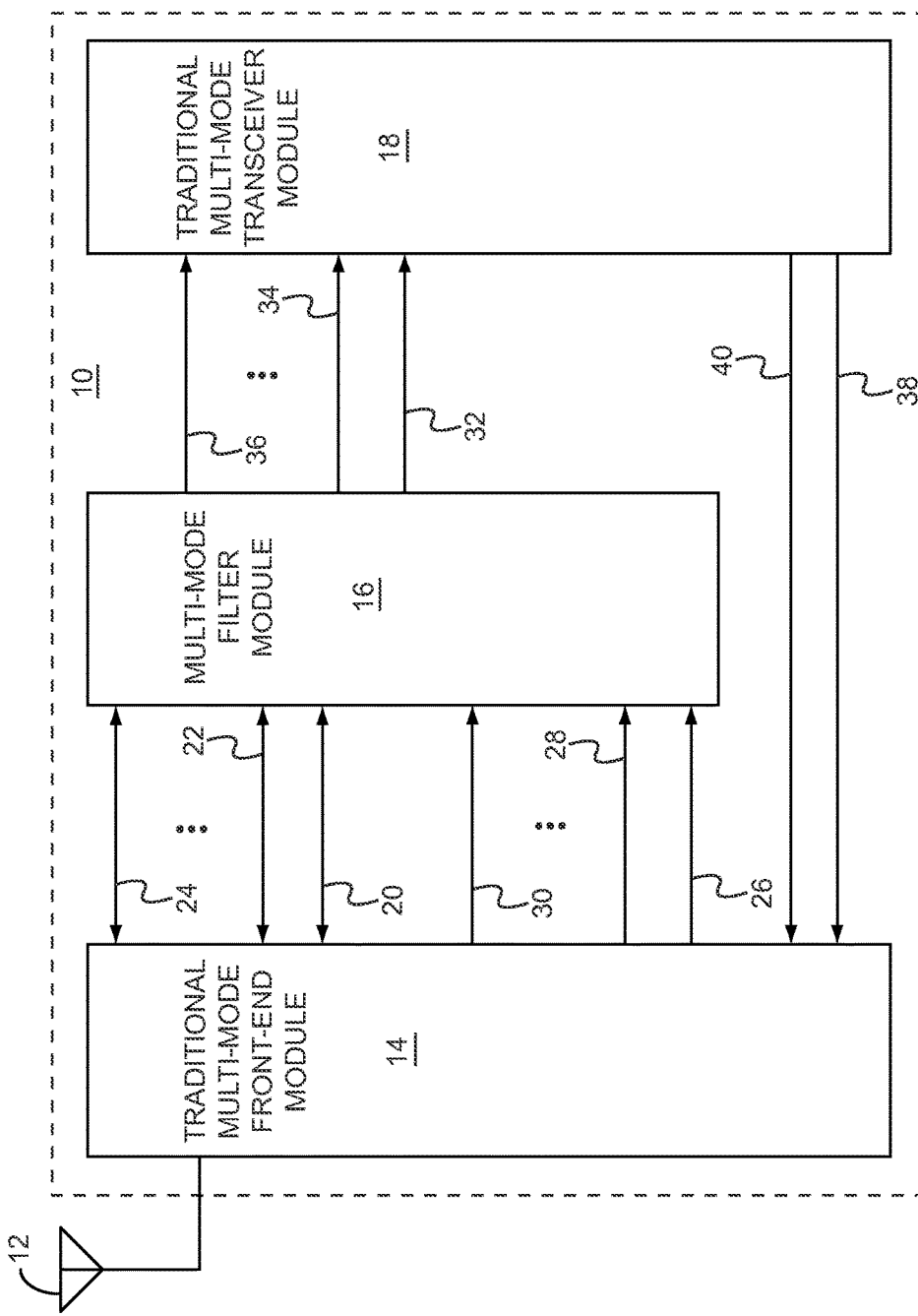
FIG. 1 shows a traditional multi-mode wireless communications device according to the prior art.
Figure 2:
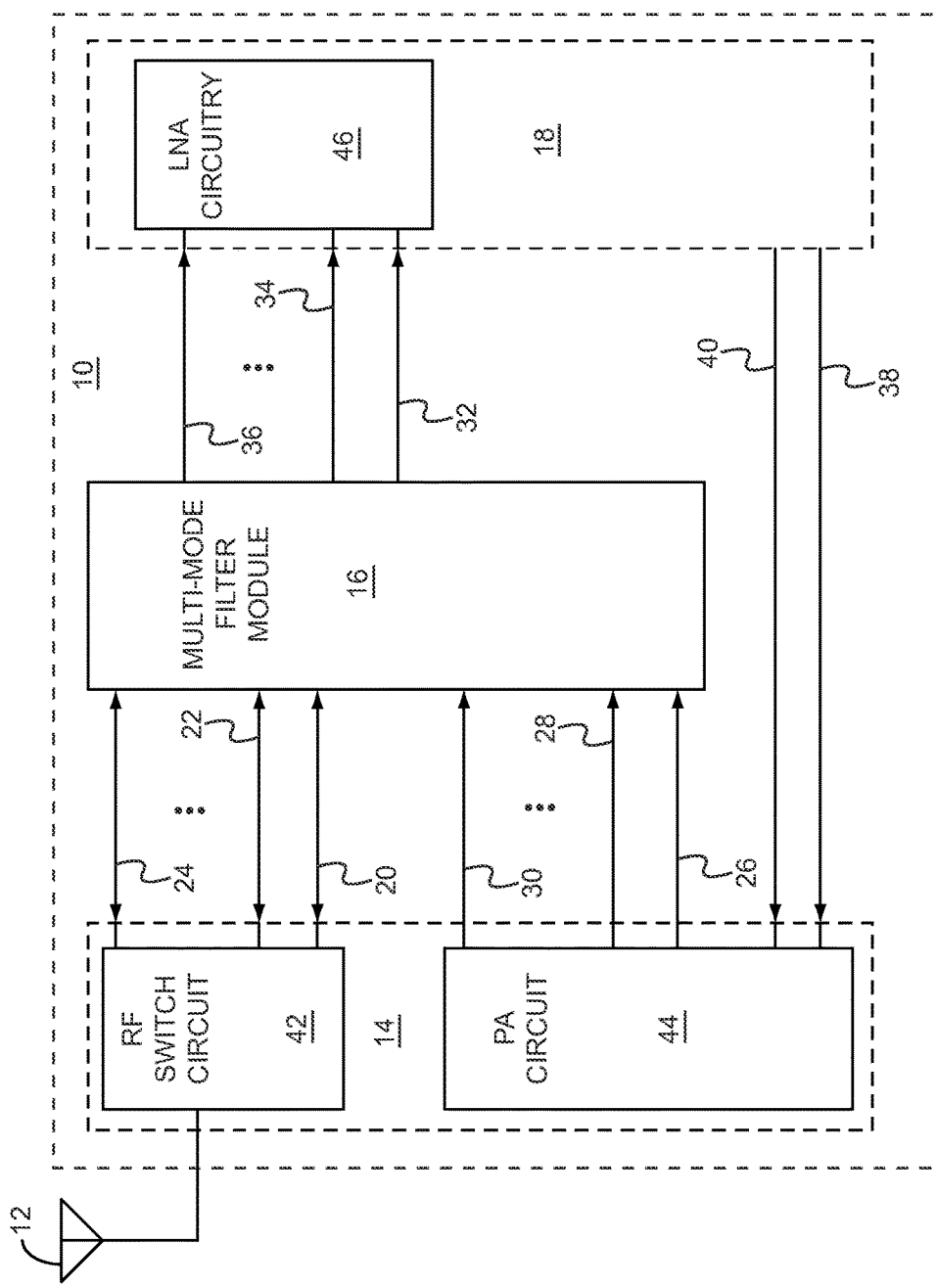
FIG. 2 shows details of the traditional multi-mode wireless communications device illustrated in FIG. 1 according to the prior art.
Figure 3:
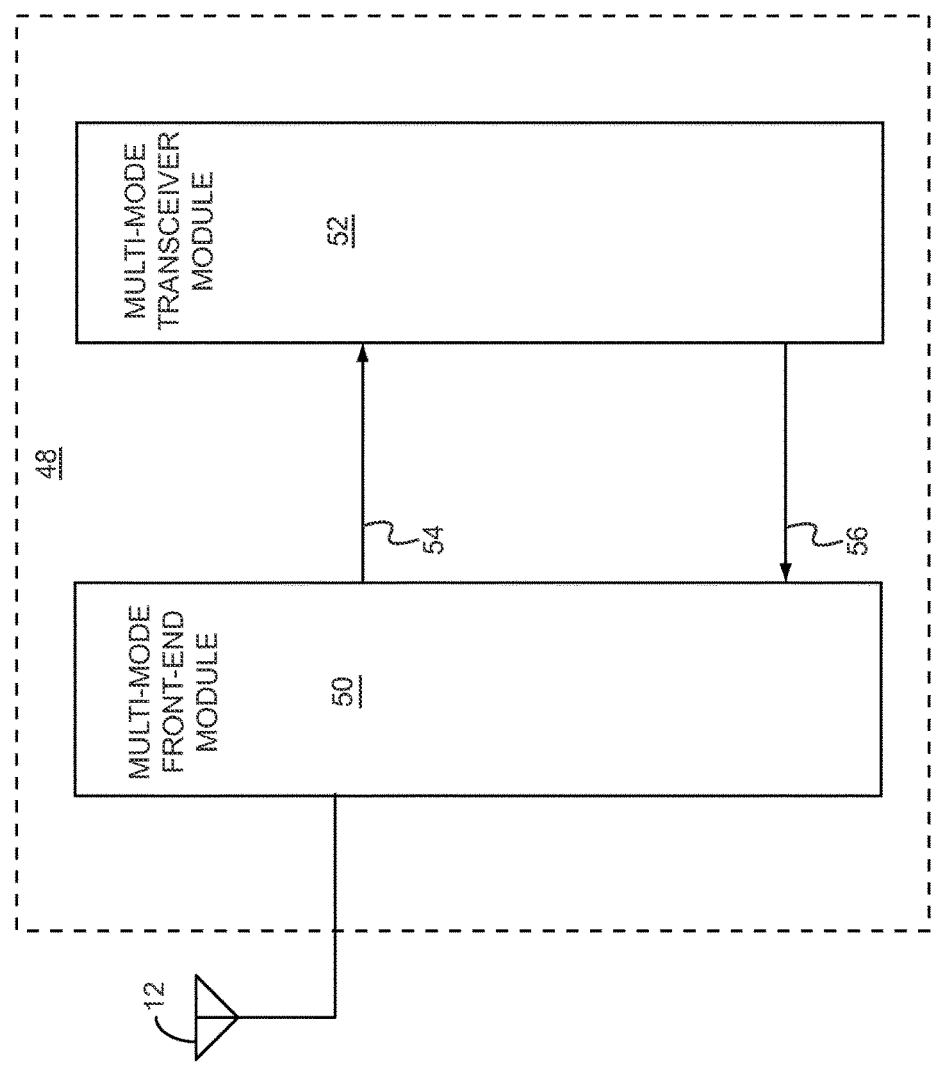
FIG. 3 shows a multi-mode RF system according to one embodiment of the multi-mode RF system.

FIG. 3 shows a multi-mode RF system 48 according to one embodiment of the multi-mode RF system 48. The multi-mode RF system 48 is capable of transmitting and receiving RF signals using any of multiple RF communications bands and is coupled to the RF antenna 12, which is used for transmitting and receiving wireless signals. The multi-mode RF system 48 includes a multi-mode front-end module 50 and a multi-mode transceiver module 52. The multi-mode transceiver module 52 may be highly integrated by combining RF and digital functions into a single module. As such, the multi-mode transceiver module 52 may provide baseband processing associated with the transmitted and received RF signals, RF modulation to create RF signals for transmission, or both.

The multi-mode front-end module 50 may integrate RF band specific RF bandpass filters (not shown) and LNAs (not shown), such that each filter and amplifier pair provides selection and gain for at least one of the RF communications bands. The outputs of the LNAs may be combined to provide a first common signal 54 to the multi-mode transceiver module 52. The first common signal 54 may be either single-ended or differential. The multi-mode transceiver module 52 may provide a first RF transmit signal 56 to the multi-mode front-end module 50 for amplification and transmission. The first RF transmit signal 56 may be either single-ended or differential. The multi-mode RF system 48 illustrated in FIG. 3 is an exemplary embodiment of the present disclosure and not intended to limit the scope of the present disclosure. Other embodiments of the multi-mode RF system 48 may omit any or all of the blocks shown in FIG. 3, may add other blocks, may modify any or all of the blocks shown in FIG. 3, or any combination thereof.

Figure 4:
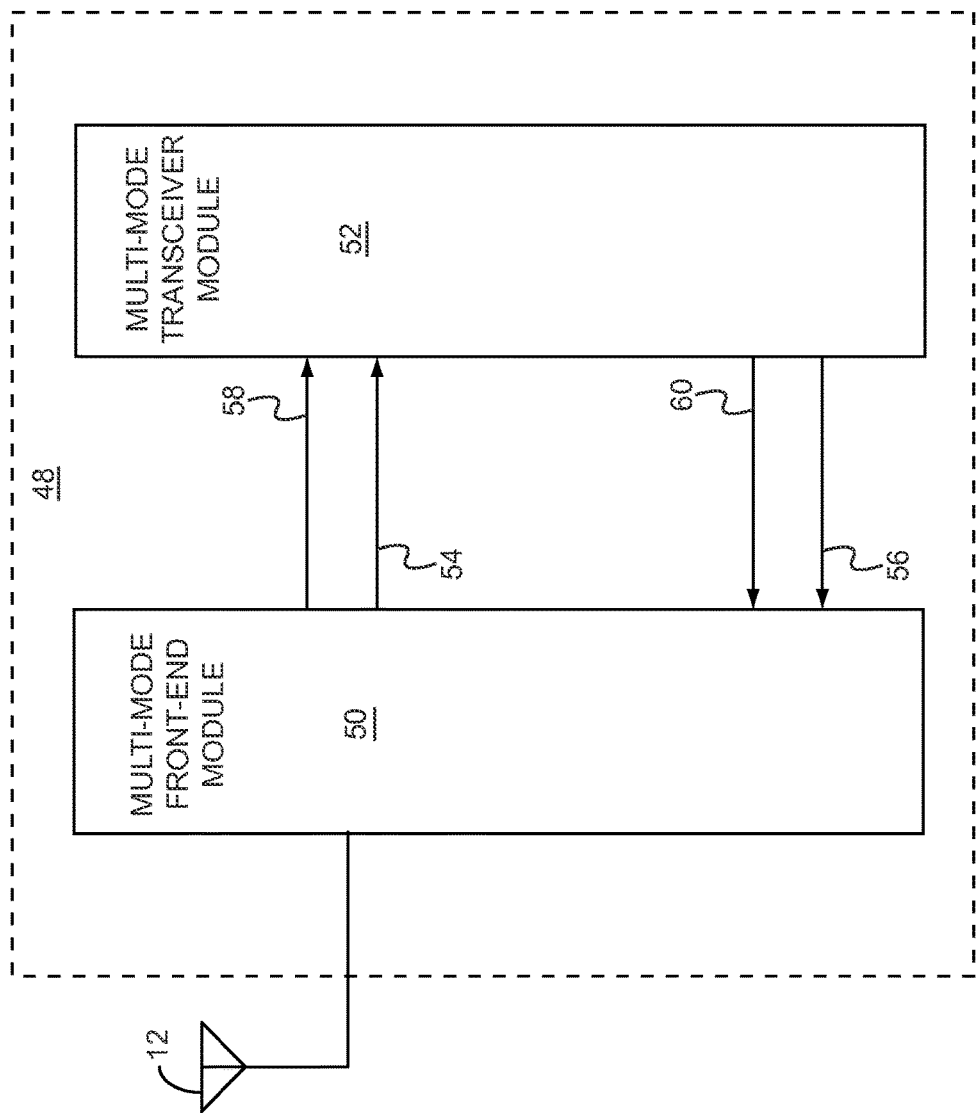
FIG. 4 shows the multi-mode RF system according to an alternate embodiment of the multi-mode RF system.

FIG. 4 shows the multi-mode RF system 48 according to an alternate embodiment of the multi-mode RF system 48. The multi-mode RF system 48 illustrated in FIG. 4 is similar to the multi-mode RF system 48 illustrated in FIG. 3, except the multi-mode RF system 48 illustrated in FIG. 4 includes a second common signal 58 provided by the multi-mode front-end module 50 to the multi-mode transceiver module 52 and a second RF transmit signal 60 provided by the multi-mode transceiver module 52 to the multi-mode front-end module 50. The second common signal 58 may be either single-ended or differential. The second RF transmit signal 60 may be either single-ended or differential. The outputs of the LNAs (not shown) of the multi-mode front-end module 50 may be combined into two groups to provide the first and the second common signals 54, 58 to the multi-mode transceiver module 52. In an exemplary embodiment of the first and the second common signals 54, 58, the first common signal 54 is a low band common signal associated with low band RF communications bands and the second common signal 58 is a high band common signal associated with high band RF communications bands.

The multi-mode transceiver module 52 may provide the first and the second RF transmit signals 56, 60 to the multi-mode front-end module 50 for amplification and transmission. In an exemplary embodiment of the first and the second RF transmit signals 56, 60, the first RF transmit signal 56 is a low band RF transmit signal associated with low band RF communications bands and the second RF transmit signal 60 is a high band RF transmit signal associated with high band RF communications bands. The multi-mode RF system 48 illustrated in FIG. 4 is an exemplary embodiment of the present disclosure and not intended to limit the scope of the present disclosure. Other embodiments of the multi-mode RF system 48 may omit any or all of the blocks shown in FIG. 4, may add other blocks, may modify any or all of the blocks shown in FIG. 4, or any combination thereof.

Figure 5:
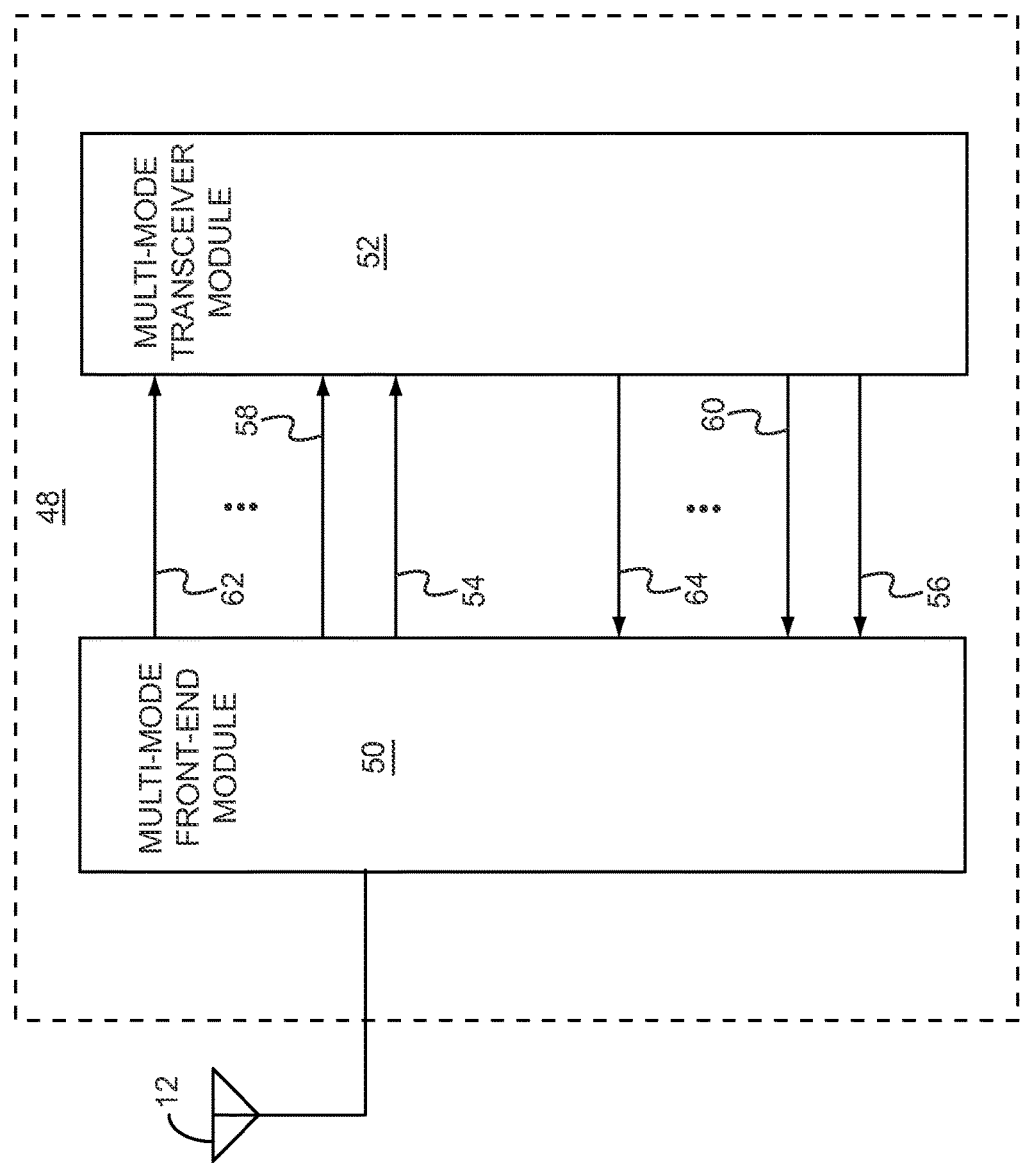
FIG. 5 shows the multi-mode RF system according to an additional embodiment of the multi-mode RF system.

FIG. 5 shows the multi-mode RF system 48 according to an additional embodiment of the multi-mode RF system 48. The multi-mode RF system 48 illustrated in FIG. 5 is similar to the multi-mode RF system 48 illustrated in FIG. 4, except the multi-mode RF system 48 illustrated in FIG. 5 further includes up to and including an $X^{TH}$ common signal 62 provided by the multi-mode front-end module 50 to the multi-mode transceiver module 52 and up to and including an $N^{TH}$ RF transmit signal 64 provided by the multi-mode transceiver module 52 to the multi-mode front-end module 50. The outputs of the LNAs (not shown) of the multi-mode front-end module 50 may be combined into M groups to provide the common signals 54, 58, 62 to the multi-mode transceiver module 52. Each of the common signals 54, 58, 62 may be either single-ended or differential. Each of the RF transmit signals 56, 60, 64 may be either single-ended or differential. In an exemplary embodiment of the common signals 54, 58, 62, X is equal to three, and the first common signal 54 is a low band common signal associated with low band RF communications bands, the second common signal 58 is a high band common signal associated with high band RF communications bands, and the $N^{TH}$ RF transmit signal 64 is an ultra-high band common signal associated with ultra-high band RF communications bands.

The multi-mode transceiver module 52 may provide the RF transmit signals 56, 60, 64 to the multi-mode front-end module 50 for amplification and transmission using the RF antenna 12. In an exemplary embodiment of the RF transmit signals 56, 60, 64, N is equal to three, and the first RF transmit signal 56 is a low band RF transmit signal associated with low band RF communications bands, the second RF transmit signal 60 is a high band RF transmit signal associated with high band RF communications bands, and the $N^{TH}$ RF transmit signal 64 is an ultra-high band RF transmit signal associated with ultra-high band RF communications bands. The multi-mode RF system 48 illustrated in FIG. 5 is an exemplary embodiment of the present disclosure and not intended to limit the scope of the present disclosure. Other embodiments of the multi-mode RF system 48 may omit any or all of the blocks shown in FIG. 5, may add other blocks, may modify any or all of the blocks shown in FIG. 5, or any combination thereof.

Figure 6:
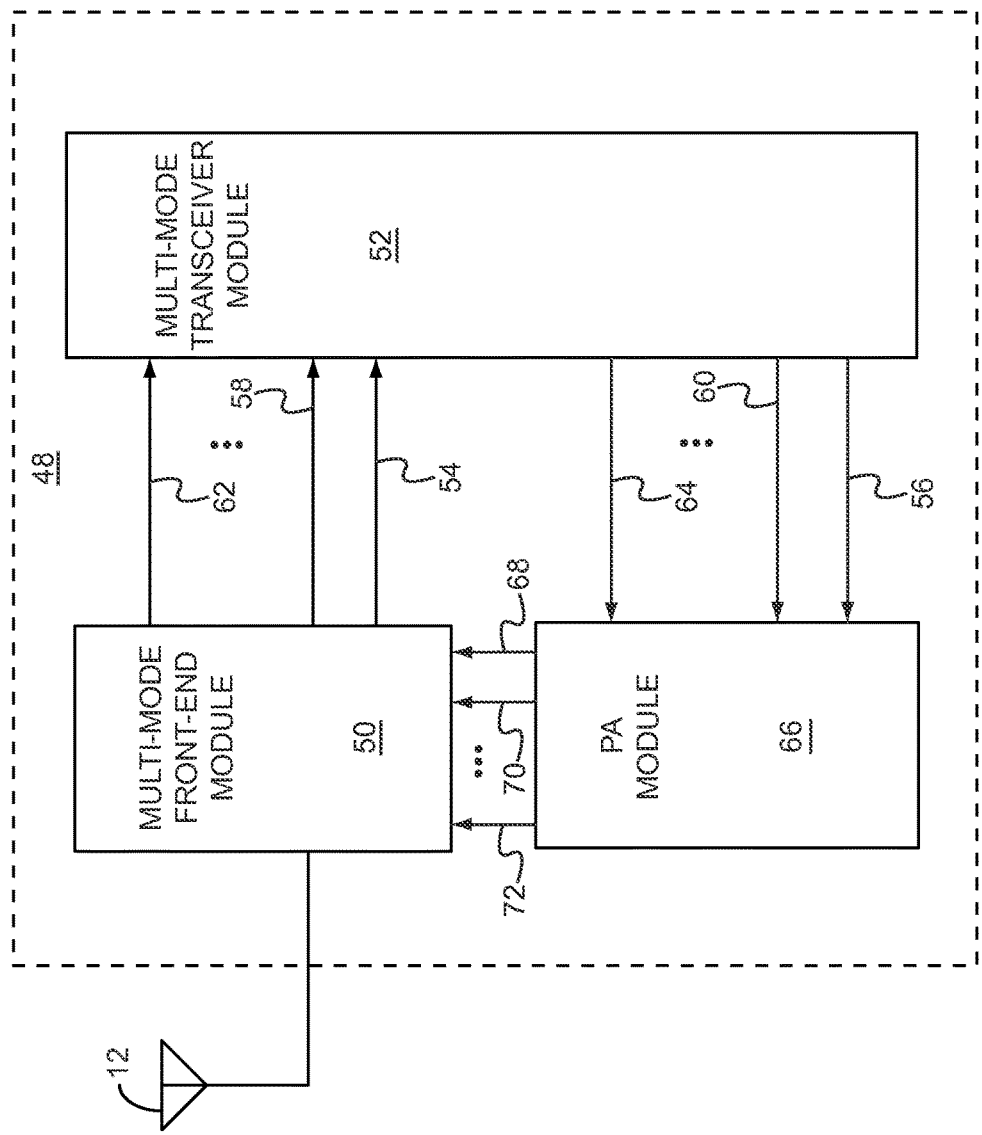
FIG. 6 shows the multi-mode RF system according to another embodiment of the multi-mode RF system.

FIG. 6 shows the multi-mode RF system 48 according to another embodiment of the multi-mode RF system 48. The multi-mode RF system 48 illustrated in FIG. 6 is similar to the multi-mode RF system 48 illustrated in FIG. 5, except the multi-mode RF system 48 illustrated in FIG. 6 includes a power amplifier (PA) module 66 between the multi-mode transceiver module 52 and the multi-mode front-end module 50 to receive and amplify the RF transmit signals 56, 60, 64 to provide a first amplified RF transmit signal 68, a second amplified RF transmit signal 70, and up to and including a $P^{TH}$ amplified RF transmit signal 72 to the multi-mode front-end module 50. The multi-mode front-end module 50 may use the amplified RF transmit signals 68, 70, 72 for transmission using the RF antenna 12. During RF operation, in which RF signals are transmitted and received using a selected RF communications band, the PA module 66 may amplify one or more of the RF transmit signals 56, 60, 64 that are associated with the selected RF communications band and provide one or more of the amplified RF transmit signals 68, 70, 72, which are associated with the selected RF communications band, based on which of the RF transmit signals 56, 60, 64 are amplified.

Each of the amplified RF transmit signals 68, 70, 72 may be either single-ended or differential. In a first exemplary embodiment of the multi-mode RF system 48, any or all of the amplified RF transmit signals 68, 70, 72 may be omitted. In a second exemplary embodiment of the multi-mode RF system 48, all of the amplified RF transmit signals 68, 70, 72 except the first amplified RF transmit signal 68 are omitted. In a third exemplary embodiment of the multi-mode RF system 48, all of the amplified RF transmit signals 68, 70, 72 except the first and the second amplified RF transmit signals 68, 70 are omitted.

In a fourth exemplary embodiment of the multi-mode RF system 48, any or all of the RF transmit signals 56, 60, 64 may be omitted. In a fifth exemplary embodiment of the multi-mode RF system 48, all of the RF transmit signals 56, 60, 64 except the first RF transmit signal 56 are omitted. In a sixth exemplary embodiment of the multi-mode RF system 48, all of the RF transmit signals 56, 60, 64 except the first and the second RF transmit signals 56, 60 are omitted. The multi-mode RF system 48 illustrated in FIG. 6 is an exemplary embodiment of the present disclosure and not intended to limit the scope of the present disclosure. Other embodiments of the multi-mode RF system 48 may omit any or all of the blocks shown in FIG. 6, may add other blocks, may modify any or all of the blocks shown in FIG. 6, or any combination thereof.

Figure 7:
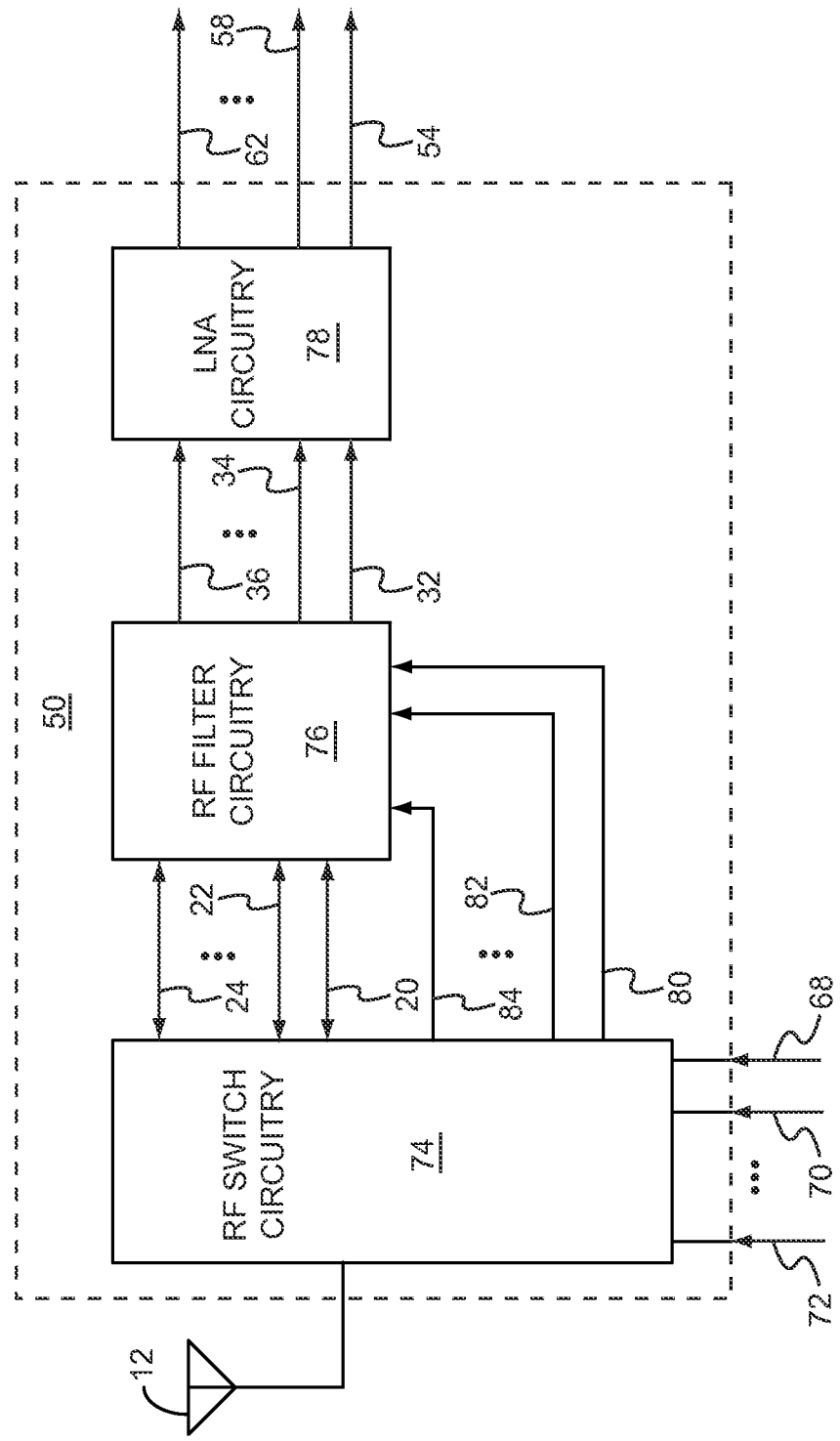
FIG. 7 shows details of a multi-mode front-end module according to one embodiment of the multi-mode front-end module.

FIG. 7 shows details of the multi-mode front-end module 50 illustrated in FIG. 6 according to one embodiment of the multi-mode front-end module 50. The multi-mode front-end module 50 includes RF switch circuitry 74, RF filter circuitry 76, and LNA circuitry 78 that form a receive chain. The RF switch circuitry 74 is coupled between the RF antenna 12 and the RF filter circuitry 76. The bi-directional RF signals 20, 22, 24 may be used to transfer RF information between the RF antenna 12 and the RF filter circuitry 76 through the RF switch circuitry 74. The RF switch circuitry 74 may include switching circuitry to couple one or more of the bi-directional RF signals 20, 22, 24 to the RF antenna 12 and to isolate one or more of the bi-directional RF signals 20, 22, 24 from the RF antenna 12. During RF operation, in which RF signals are transmitted and received using a selected RF communications band, the RF switch circuitry 74 may couple one or more of the bi-directional RF signals 20, 22, 24 that are associated with the selected RF communications band to the RF antenna 12. Each of the bi-directional RF signals 20, 22, 24 may be either single-ended or differential.

The RF switch circuitry 74 receives the amplified RF transmit signals 68, 70, 72 and provides a first switched RF transmit signal 80, a second switched RF transmit signal 82, and up to and including a $Y^{TH}$ switched RF transmit signal 84 to the RF filter circuitry 76 based on the amplified RF transmit signals 68, 70, 72. Each of the switched RF transmit signals 80, 82, 84 may be either single-ended or differential. The RF switch circuitry 74 may include switching circuitry to couple one or more of the amplified RF transmit signals 68, 70, 72 to the RF filter circuitry 76 and to isolate one or more of the amplified RF transmit signals 68, 70, 72 from the RF filter circuitry 76. During RF operation, in which RF signals are transmitted and received using a selected RF communications band, the RF switch circuitry 74 may couple one or more of the amplified RF transmit signals 68, 70, 72 that are associated with the selected RF communications band to the to the RF filter circuitry 76.

The RF filter circuitry 76 may include one or more duplexers (not shown), one or more bandpass filters (not shown), other types of filters, or any combination thereof. As previously mentioned, a duplexer is a special type of RF filter having two non-overlapping passbands and may be used to process a combined bi-directional RF signal as separate RF transmit and RF receive signals. Specifically, each duplexer may be used to receive one of the switched RF transmit signals 80, 82, 84 within a transmit passband and provide one of the bi-directional RF signals 20, 22, 24 based on a corresponding one of the switched RF transmit signals 80, 82, 84. One of the bi-directional RF signals 20, 22, 24 may also be used to simultaneously receive an RF receive signal embedded in the one of the bi-directional RF signals 20, 22, 24 within a receive passband and extract and provide the extracted RF receive signal as one of the RF receive signals 32, 34, 36 to the LNA circuitry 78. Therefore, each duplexer may be associated with one of the bi-directional RF signals 20, 22, 24, one of the RF receive signals 32, 34, 36, and one of the switched RF transmit signals 80, 82, 84. Each of the RF receive signals 32, 34, 36 may be either single-ended or differential. During RF operation, in which RF signals are transmitted and received using a selected transmit RF communications band and a selected receive RF communications band, the RF filter circuitry 76 may filter one or more of the switched RF transmit signals 80, 82, 84 that are associated with the selected transmit RF communications band and may filter an RF receive signal embedded in the one or more of the bi-directional RF signals 20, 22, 24.

In one example of the multi-mode front-end module 50, the RF filter circuitry 76 has a duplexer for each of the bi-directional RF signals 20, 22, 24 that corresponds to one of the RF receive signals 32, 34, 36 and to one of the switched RF transmit signals 80, 82, 84. Additionally, each duplexer is associated with an RF communications band. Therefore, each of the RF receive signals 32, 34, 36 and each of the switched RF transmit signals 80, 82, 84 is associated with an RF communications band. The LNA circuitry 78 may receive and amplify the RF receive signals 32, 34, 36 to provide the common signals 54, 58, 62. As such, the common signals 54, 58, 62 illustrated in FIG. 7 are RF signals. In an exemplary embodiment of the LNA circuitry 78, P is equal to X, such that the number of RF receive signals 32, 34, 36 is equal to the number of common signals 54, 58, 62 and there is a one to one correlation between each of the RF receive signals 32, 34, 36 and each of the common signals 54, 58, 62. The multi-mode front-end module 50 illustrated in FIG. 7 is an exemplary embodiment of the present disclosure and not intended to limit the scope of the present disclosure. Other embodiments of the multi-mode front-end module 50 may omit any or all of the blocks shown in FIG. 7, may add other blocks, may modify any or all of the blocks shown in FIG. 7, or any combination thereof.

Figure 8:
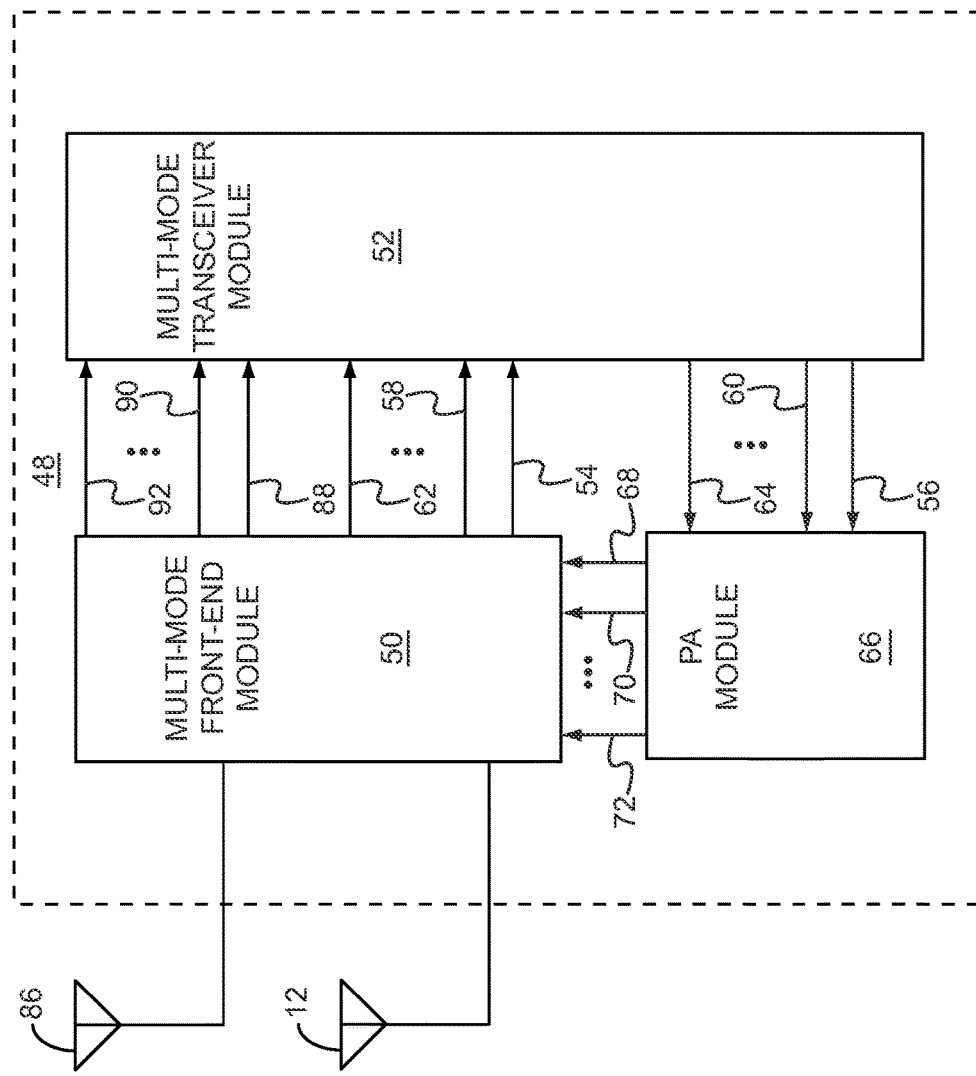
FIG. 8 shows the multi-mode RF system according to a supplemental embodiment of the multi-mode RF system.

FIG. 8 shows the multi-mode RF system 48 according to a supplemental embodiment of the multi-mode RF system 48. Antenna diversity is a technique involving at least two antennas capable of receiving an RF receive signal to reduce multi-path signal distortion. For example, in a two antenna system, one antenna, another antenna, or both antennas may receive the RF receive signal. The multi-mode RF system 48 is a diversity RF system and is similar to the multi-mode RF system 48 illustrated in FIG. 6 except the multi-mode front-end module 50 is a diversity front-end module having a diversity receive chain, which may be similar to the receive chain of the multi-mode front-end module 50 illustrated in FIG. 7.

The multi-mode front-end module 50 is coupled to a diversity RF antenna 86 and provides a first diversity common signal 88, a second diversity common signal 90, and an $X^{TH}$ diversity common signal 92 to the multi-mode transceiver module 52 based on received RF signals from the diversity RF antenna 86. The multi-mode RF system 48 illustrated in FIG. 8 is an exemplary embodiment of the present disclosure and not intended to limit the scope of the present disclosure. Other embodiments of the multi-mode RF system 48 may omit any or all of the blocks shown in FIG. 8, may add other blocks, may modify any or all of the blocks shown in FIG. 8, or any combination thereof.

Figure 9:
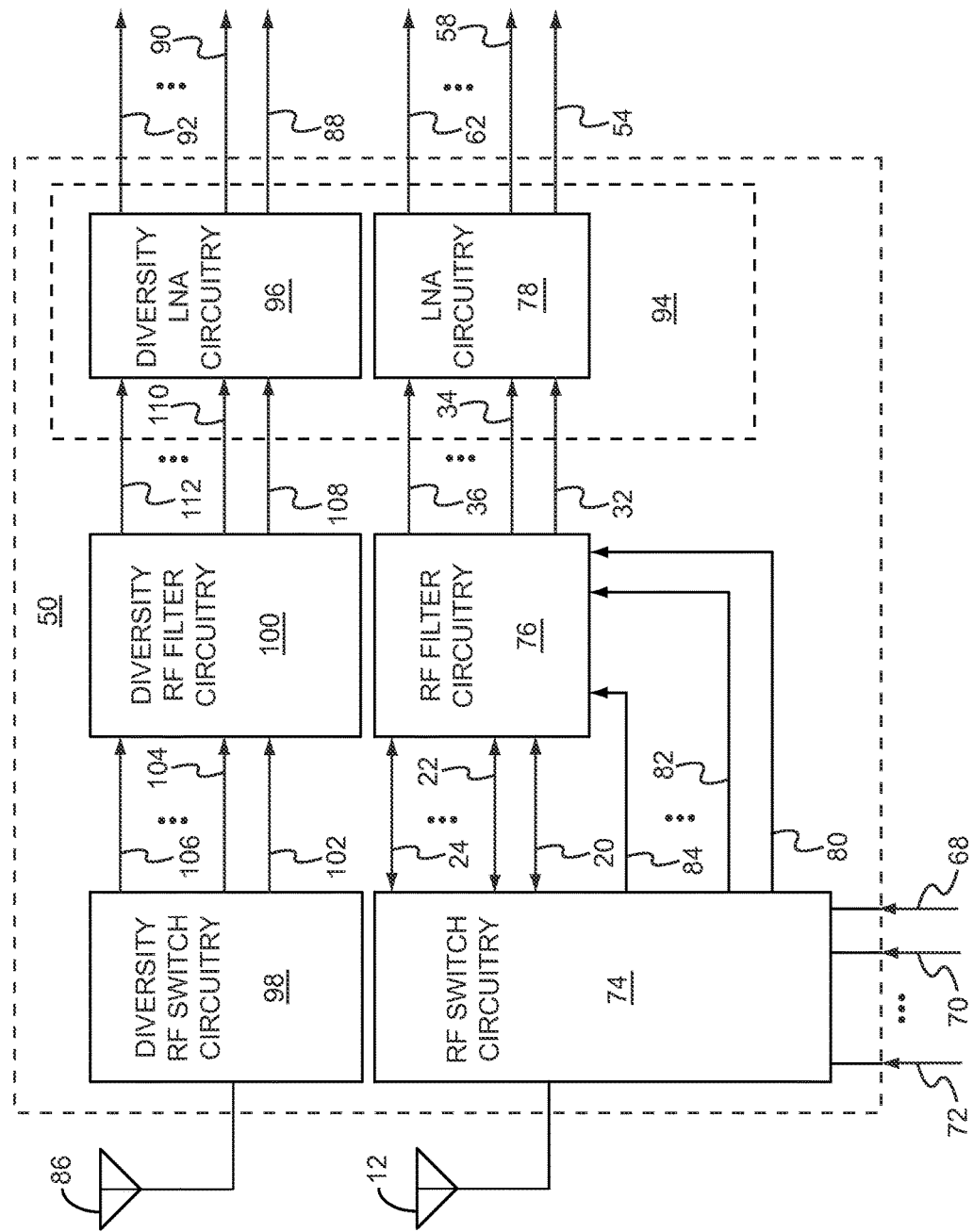
FIG. 9 shows details of the multi-mode front-end module according to an alternate embodiment of the multi-mode front-end module.

FIG. 9 shows details of the multi-mode front-end module 50 illustrated in FIG. 8 according to an alternate embodiment of the multi-mode front-end module 50. The multi-mode front-end module 50 includes an RF amplifier semiconductor die 94, which includes the LNA circuitry 78 and diversity LNA circuitry 96. The multi-mode front-end module 50 further includes diversity RF switch circuitry 98 and diversity RF filter circuitry 100. In an alternate embodiment of the multi-mode front-end module 50, the RF amplifier semiconductor die 94 does not include the diversity LNA circuitry 96. The diversity RF switch circuitry 98 may receive RF signals from the diversity RF antenna 86 and provide a first diversity receive signal 102, a second diversity receive signal 104, and up to and including a $P^{TH}$ diversity receive signal 106 to the diversity RF filter circuitry 100 similar to the way the RF switch circuitry 74 may receive RF signals from the RF antenna 12 and provide the bi-directional RF signals 20, 22, 24 to the RF filter circuitry 76.

The diversity RF filter circuitry 100 may receive and filter the diversity receive signals 102, 104, 106 to provide a first diversity filtered signal 108, a second diversity filtered signal 110, and up to and including a $P^{TH}$ diversity filtered signal 112 to the diversity LNA circuitry 96 similar to the way the RF filter circuitry 76 may receive and filter the bi-directional RF signals 20, 22, 24 to provide the RF receive signals 32, 34, 36 to the LNA circuitry 78. The diversity LNA circuitry 96 may receive and amplify the diversity filtered signals 108, 110, 112 to provide the diversity common signals 88, 90, 92 to the multi-mode transceiver module 52 (FIG. 8) similar to the way the LNA circuitry 78 may receive and amplify the RF receive signals 32, 34, 36 to provide the common signals 54, 58, 62 to the multi-mode transceiver module 52 (FIG. 8). Each of the diversity receive signals 102, 104, 106 may be either single-ended or differential. Each of the diversity filtered signals 108, 110, 112 may be either single-ended or differential. The multi-mode front-end module 50 illustrated in FIG. 9 is an exemplary embodiment of the present disclosure and not intended to limit the scope of the present disclosure. Other embodiments of the multi-mode front-end module 50 may omit any or all of the blocks shown in FIG. 9, may add other blocks, may modify any or all of the blocks shown in FIG. 9, or any combination thereof.

Figure 10:
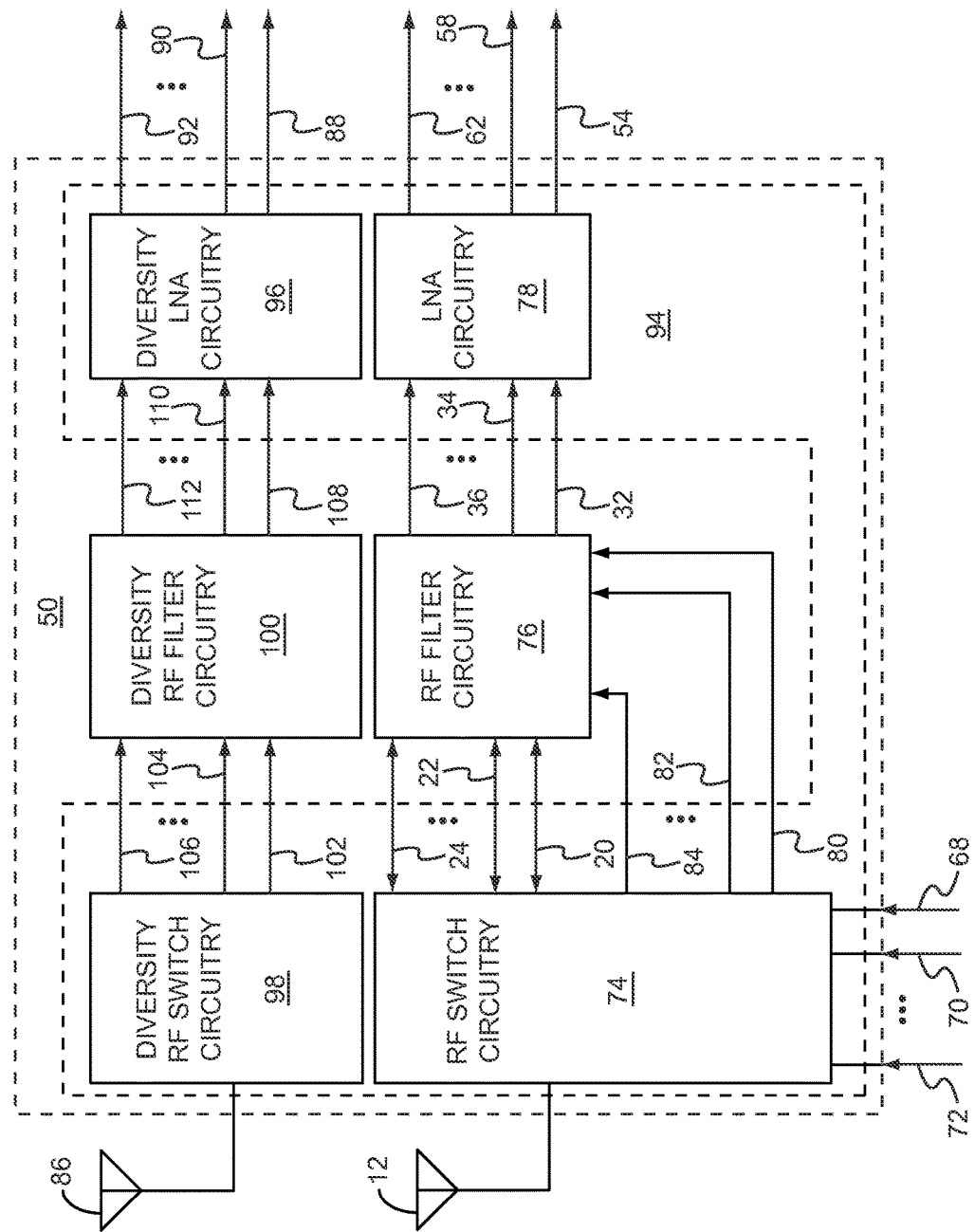
FIG. 10 shows details of the multi-mode front-end module according to an additional embodiment of the multi-mode front-end module.

FIG. 10 shows details of the multi-mode front-end module 50 illustrated in FIG. 8 according to an additional embodiment of the multi-mode front-end module 50. The multi-mode front-end module 50 illustrated in FIG. 10 is similar to the multi-mode front-end module 50 illustrated in FIG. 9 except in the multi-mode front-end module 50 illustrated in FIG. 10, in addition to the diversity LNA circuitry 96 and the LNA circuitry 78, the RF amplifier semiconductor die 94 includes the RF switch circuitry 74 and the diversity RF switch circuitry 98. In an alternate embodiment of the multi-mode front-end module 50, the RF amplifier semiconductor die 94 does not include the diversity LNA circuitry 96 and the diversity RF switch circuitry 98. The multi-mode front-end module 50 illustrated in FIG. 10 is an exemplary embodiment of the present disclosure and not intended to limit the scope of the present disclosure. Other embodiments of the multi-mode front-end module 50 may omit any or all of the blocks shown in FIG. 10, may add other blocks, may modify any or all of the blocks shown in FIG. 10, or any combination thereof.

Figure 11:
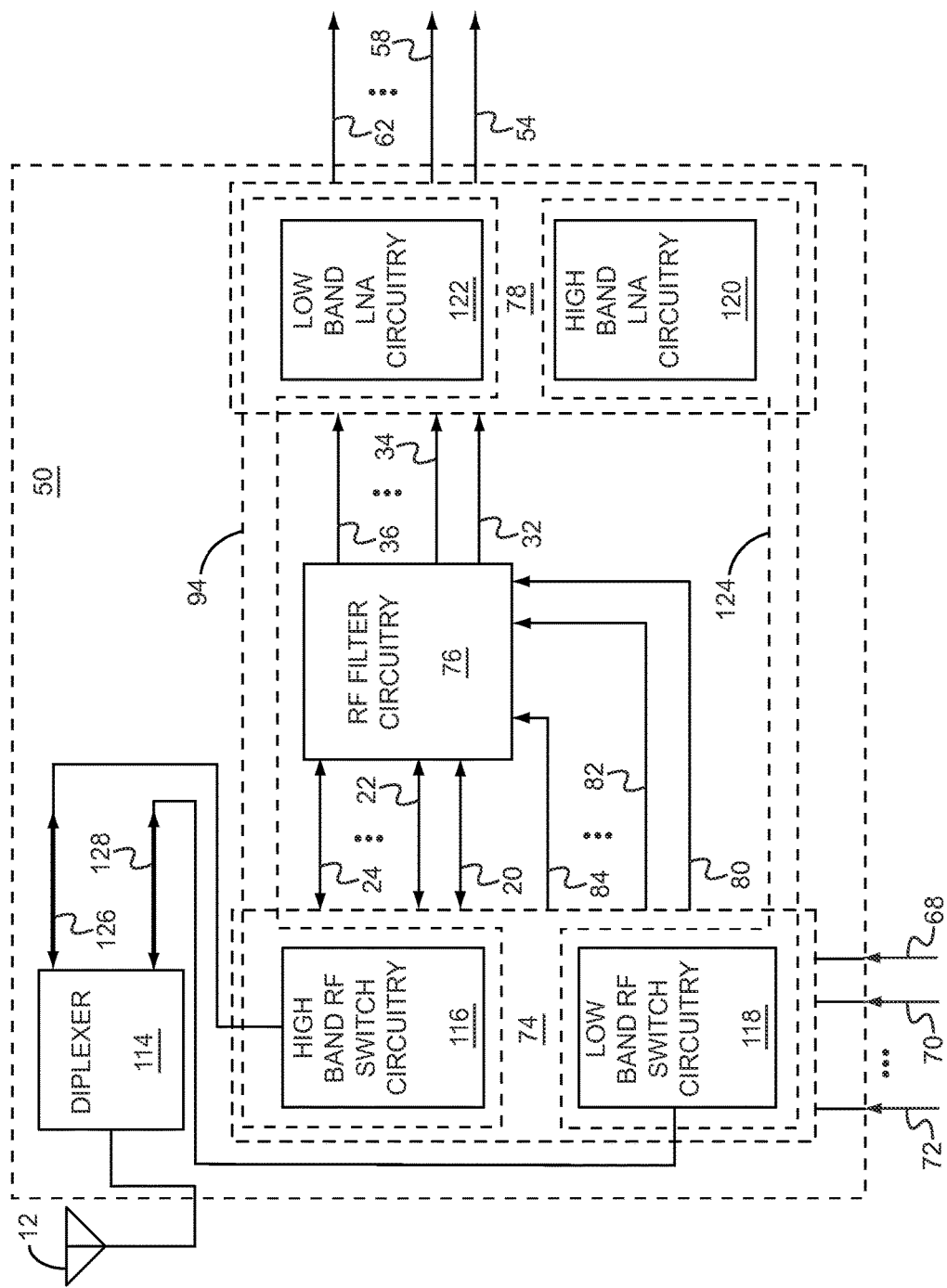
FIG. 11 shows details of the multi-mode front-end module according to another embodiment of the multi-mode front-end module.

FIG. 11 shows details of the multi-mode front-end module 50 according to another embodiment of the multi-mode front-end module 50. The multi-mode front-end module 50 in FIG. 11 is similar to the multi-mode front-end module 50 illustrated in FIG. 7 except the multi-mode front-end module 50 illustrated in FIG. 11 includes a diplexer 114 and the RF switch circuitry 74 and the LNA circuitry 78 are partitioned onto two separate semiconductor dies. The RF switch circuitry 74 includes high band RF switch circuitry 116 and low band RF switch circuitry 118, and the LNA circuitry 78 includes high band LNA circuitry 120 and low band LNA circuitry 122. The RF amplifier semiconductor die 94 includes the high band RF switch circuitry 116 and the low band LNA circuitry 122, and a supplemental RF amplifier semiconductor die 124 includes the low band RF switch circuitry 118 and the high band LNA circuitry 120.

A diplexer is known in the art as a device that may divide an RF spectrum into two parts, which may include a high band and a low band. As such, a diplexer may include a high pass filter (not shown) to provide high band signals and a low pass filter (not shown) to provide low band signals. The diplexer 114 is coupled to the RF antenna 12 and provides a high band bi-directional RF signal 126 between the high band RF switch circuitry 116 and the diplexer 114, and provides a low band bi-directional RF signal 128 between the low band RF switch circuitry 118 and the diplexer 114. The low band RF switch circuitry 118 may process only low band RF signals to or from the RF antenna 12 and the high band RF switch circuitry 116 may process only high band RF signals to or from the RF antenna 12. As such, any of the amplified RF transmit signals 68, 70, 72 that are high band RF signals may be routed through the high band RF switch circuitry 116 and any of the amplified RF transmit signals 68, 70, 72 that are low band RF signals may be routed through the low band RF switch circuitry 118. Similarly, any of the bi-directional RF signals 20, 22, 24 that are high band RF signals may be routed through the high band RF switch circuitry 116 and any of the bi-directional RF signals 20, 22, 24 that are low band RF signals may be routed through the low band RF switch circuitry 118. Further, any of the switched RF transmit signals 80, 82, 84 that are high band RF signals may be routed through the high band RF switch circuitry 116 and any of the switched RF transmit signals 80, 82, 84 that are low band RF signals may be routed through the low band RF switch circuitry 118.

In a first exemplary embodiment of the multi-mode front-end module 50, the high band signals have frequencies greater than or equal to about 2.5 gigahertz and the low band signals have frequencies less than about 2.5 gigahertz. In a second exemplary embodiment of the multi-mode front-end module 50, the high band signals have frequencies greater than about 2.4 gigahertz and the low band signals have frequencies less than about 2.4 gigahertz. In a third exemplary embodiment of the multi-mode front-end module 50, the high band signals have frequencies greater than about 2.3 gigahertz and the low band signals have frequencies less than about 2.3 gigahertz. In a fourth exemplary embodiment of the multi-mode front-end module 50, the high band signals have frequencies greater than about 2.2 gigahertz and the low band signals have frequencies less than about 2.2 gigahertz. In a fifth exemplary embodiment of the multi-mode front-end module 50, the high band signals have frequencies greater than about 1.0 gigahertz and the low band signals have frequencies less than about 1.0 gigahertz. In a seventh exemplary embodiment of the multi-mode front-end module 50, the high band signals have frequencies greater than about 1.7 gigahertz and the low band signals have frequencies less than about 1.7 gigahertz. In a second exemplary embodiment of the multi-mode front-end module 50, the high band signals have frequencies greater than about 1.4 gigahertz and the low band signals have frequencies less than about 1.4 gigahertz.

Turning to the LNA circuitry 78, any of the RF receive signals 32, 34, 36 that are high band RF signals may be routed through the high band LNA circuitry 120 and any of the RF receive signals 32, 34, 36 that are low band RF signals may be routed through the low band LNA circuitry 122. Typically, the multi-mode front-end module 50 may process either high band RF signals or low band RF signals, but not both simultaneously. Therefore, when the multi-mode front-end module 50 is processing high band RF signals, the high band LNA circuitry 120 is processing RF signals and the low band RF switch circuitry 118 is not processing signals. Since both the high band LNA circuitry 120 and the low band RF switch circuitry 118 are included in the supplemental RF amplifier semiconductor die 124 and the high band RF switch circuitry 116, which is processing signals, is not included in the supplemental RF amplifier semiconductor die 124, the high band LNA circuitry 120 is isolated from active switch circuitry and may be subjected to less noise and de-sensing than if the high band LNA circuitry 120 was co-located with active switch circuitry.

Similarly, since both the low band LNA circuitry 122 and the high band RF switch circuitry 116 are included in the RF amplifier semiconductor die 94 and the low band RF switch circuitry 118, which is processing signals, is not included in the RF amplifier semiconductor die 94, the low band LNA circuitry 122 is isolated from active switch circuitry and may be subjected to less noise and de-sensing than if the low band LNA circuitry 122 was co-located with active switch circuitry. The multi-mode front-end module 50 illustrated in FIG. 11 is an exemplary embodiment of the present disclosure and not intended to limit the scope of the present disclosure. Other embodiments of the multi-mode front-end module 50 may omit any or all of the blocks shown in FIG. 11, may add other blocks, may modify any or all of the blocks shown in FIG. 11, or any combination thereof.

Figure 12:
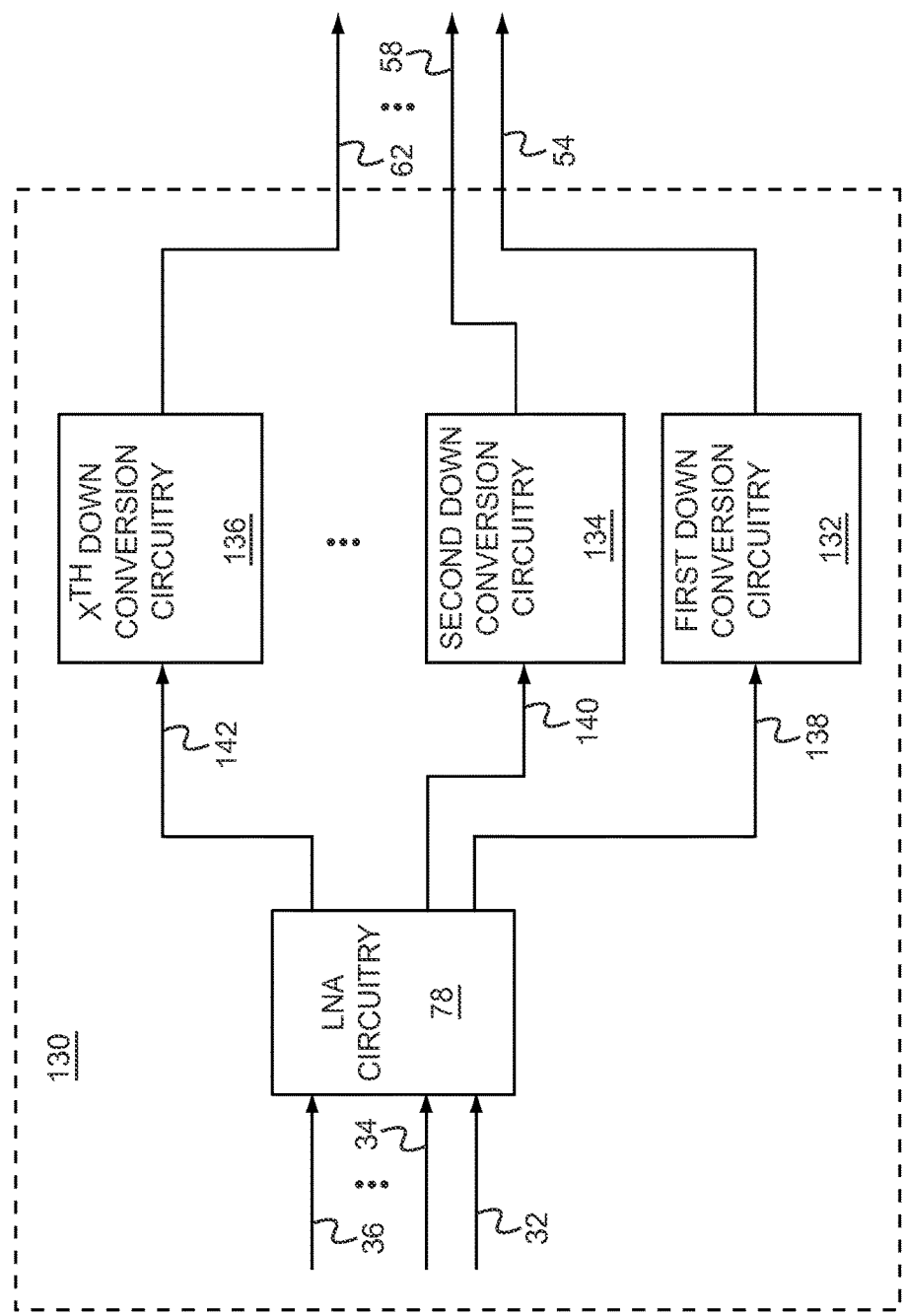
FIG. 12 shows details of a partial multi-mode front-end module according to one embodiment of the partial multi-mode front-end module.

FIG. 12 shows details of a partial multi-mode front-end module 130 according to one embodiment of the partial multi-mode front-end module 130. The partial multi-mode front-end module 130 is part of the multi-mode front-end module 50. The partial multi-mode front-end module 130 includes the LNA circuitry 78, first down conversion circuitry 132, second down conversion circuitry 134, and up to and including $X^{TH}$ down conversion circuitry 136. The LNA circuitry 78 provides a first amplified RF receive signal 138, which is based on amplifying the first RF receive signal 32, to the first down conversion circuitry 132, which down converts the first amplified RF receive signal 138 into either an intermediate frequency (IF) signal or a baseband signal to provide the first common signal 54. Similarly, the LNA circuitry 78 provides a second amplified RF receive signal 140, which is based on amplifying the second RF receive signal 34, to the second down conversion circuitry 134, which down converts the second amplified RF receive signal 140 into either an IF signal or a baseband signal to provide the second common signal 58. Further, the LNA circuitry 78 provides up to and including an $X^{TH}$ amplified RF receive signal 142, which is based on amplifying the $P^{TH}$ RF receive signal 36, to the $X^{TH}$ down conversion circuitry 136, which down converts the $X^{TH}$ amplified RF receive signal 142 into either an IF signal or a baseband signal to provide the $X^{TH}$ common signal 62.

Each of the common signals 54, 58, 62 may be either single-ended or differential. Each of the amplified RF receive signals 138, 140, 142 may be either single-ended or differential. If the down conversion circuitry 132, 134, 136 includes passive conversion elements, such as passive mixers, impedances presented to the down conversion circuitry 132, 134, 136 may be translated from an IF domain to an RF domain at inputs to the down conversion circuitry 132, 134, 136. Therefore, the down conversion circuitry 132, 134, 136 may provide some RF filtering based on the presented impedances. The partial multi-mode front-end module 130 illustrated in FIG. 12 is an exemplary embodiment of the present disclosure and not intended to limit the scope of the present disclosure. Other embodiments of the partial multi-mode front-end module 130 may omit any or all of the blocks shown in FIG. 12, may add other blocks, may modify any or all of the blocks shown in FIG. 12, or any combination thereof.

Figure 13:
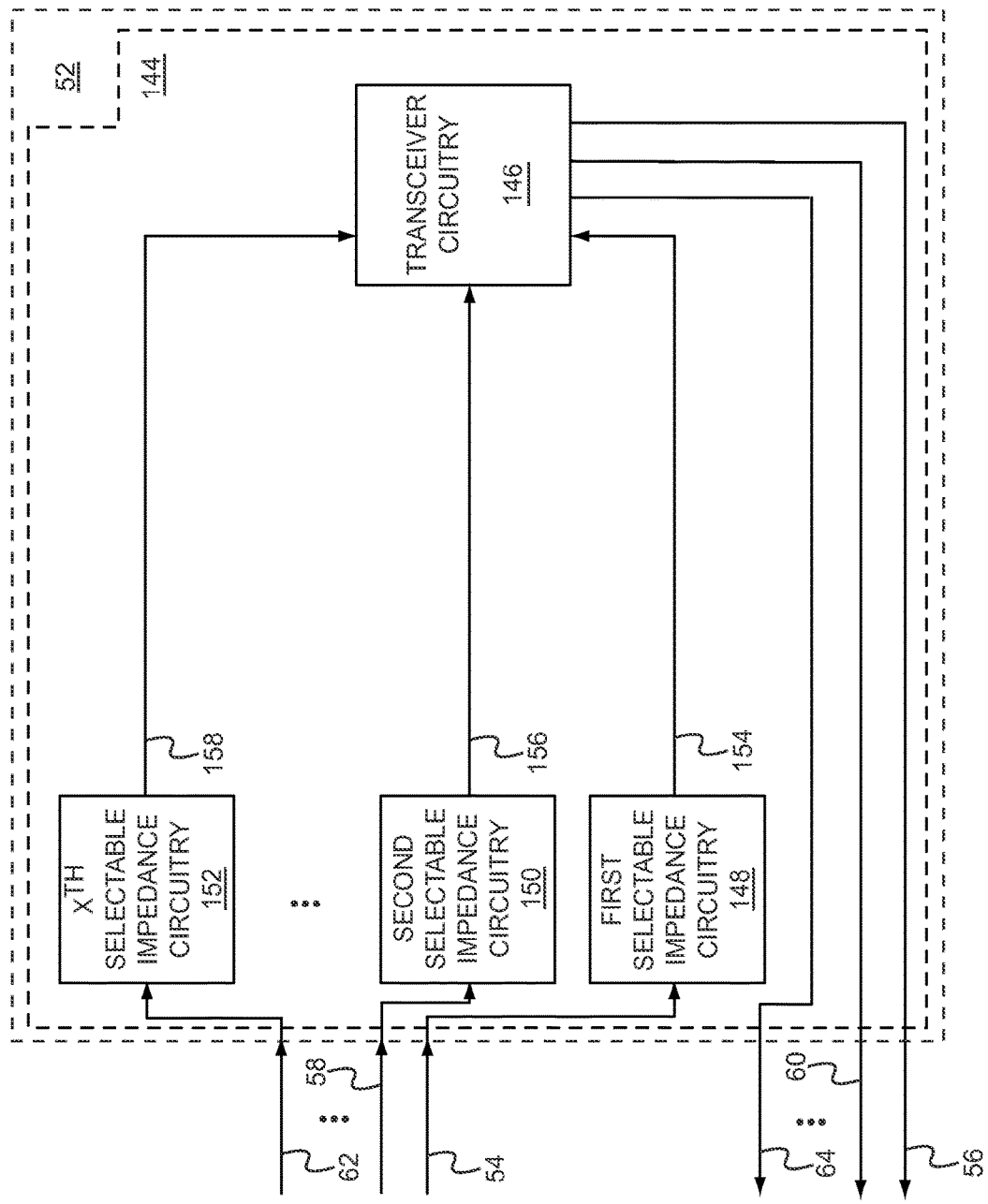
FIG. 13 shows details of a multi-mode transceiver module illustrated in FIG. 6 according to one embodiment of the multi-mode transceiver module.

FIG. 13 shows details of the multi-mode transceiver module 52 illustrated in FIG. 6 according to one embodiment of the multi-mode transceiver module 52. The multi-mode transceiver module 52 illustrated in FIG. 13 is intended to be used in conjunction with the partial multi-mode front-end module 130 illustrated in FIG. 12. As mentioned above, the partial multi-mode front-end module 130 includes down conversion circuitry 132, 134, 136. The multi-mode transceiver module 52 includes a transceiver semiconductor die 144, which includes transceiver circuitry 146, first selectable impedance circuitry 148, second selectable impedance circuitry 150, and up to and including $X^{TH}$ selectable impedance circuitry 152. The selectable impedance circuitry 148, 150, 152 is used in conjunction with the down conversion circuitry 132, 134, 136 illustrated in FIG. 12. Each of the selectable impedance circuitry 148, 150, 152 presents an impedance to a corresponding down conversion circuitry 132, 134, 136.

As previously mentioned, if the down conversion circuitry 132, 134, 136 includes passive conversion elements, such as passive mixers, the impedances presented to the down conversion circuitry 132, 134, 136 by the selectable impedance circuitry 148, 150, 152 may be translated from the IF domain to the RF domain at inputs to the down conversion circuitry 132, 134, 136. Therefore, the down conversion circuitry 132, 134, 136 may provide some RF filtering based on the presented impedances. The selectable impedance circuitry 148, 150, 152 provides a first down converted signal 154, a second down converted signal 156, and up to and including an $X^{TH}$ down converted signal 158 to the transceiver circuitry 146. Further, the transceiver circuitry 146 provides the RF transmit signals 56, 60, 64 to the PA module 66 (FIG. 6). The transceiver circuitry 146 may be highly integrated by combining RF and digital functions into a single semiconductor die. As such, the transceiver circuitry 146 may provide baseband processing associated with the transmitted and received RF signals, RF modulation to create RF signals for transmission, or both. Therefore, the transceiver circuitry 146 is associated with the transmitting and receiving RF signals using any of multiple RF communications bands. Each of the down converted signals 154, 156, 158 may be either single-ended or differential. The multi-mode transceiver module 52 illustrated in FIG. 13 is an exemplary embodiment of the present disclosure and not intended to limit the scope of the present disclosure. Other embodiments of the multi-mode transceiver module 52 may omit any or all of the blocks shown in FIG. 13, may add other blocks, may modify any or all of the blocks shown in FIG. 13, or any combination thereof.

Figure 14:
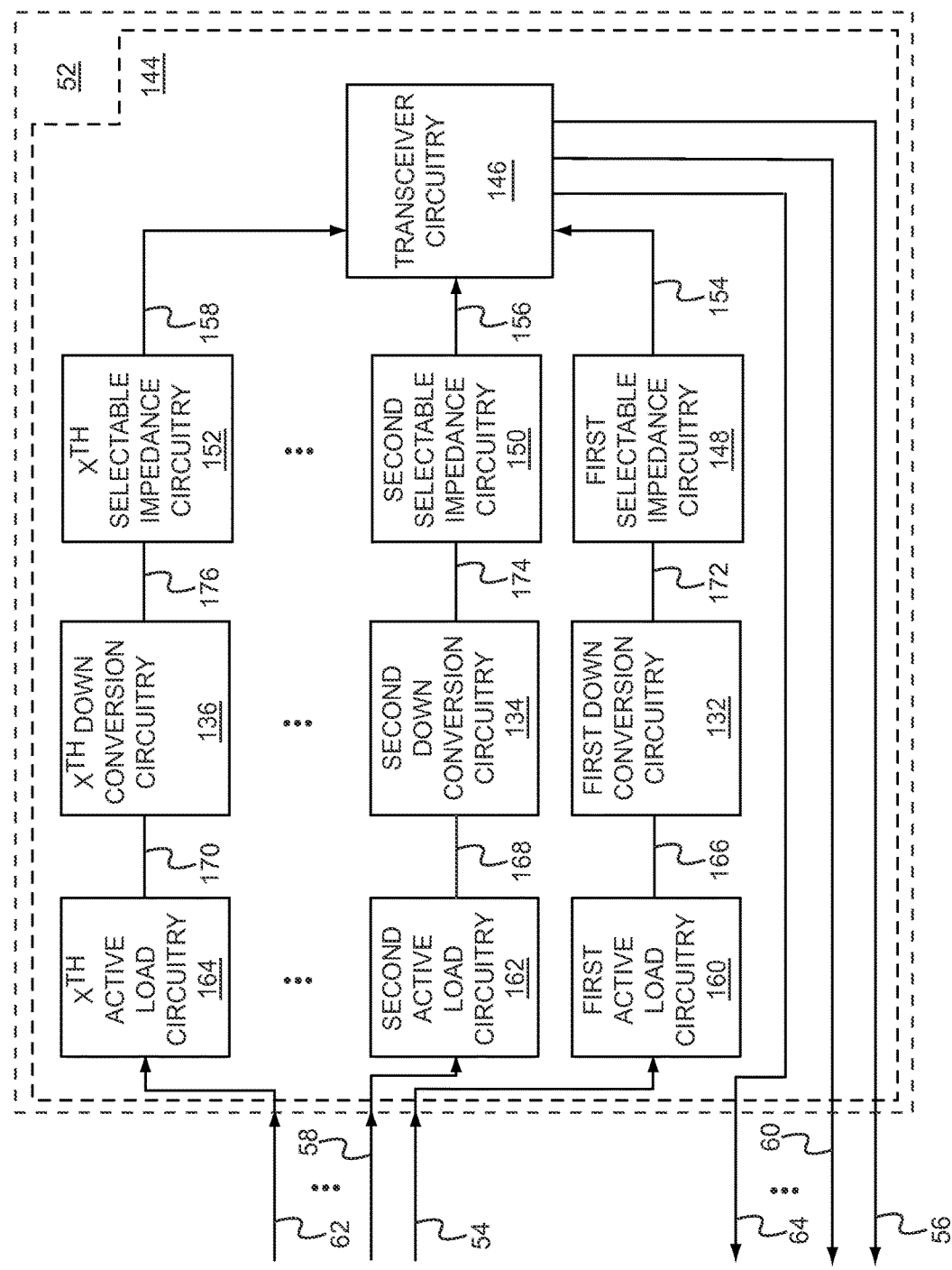
FIG. 14 shows details of the multi-mode transceiver module illustrated in FIG. 6 according to an alternate embodiment of the multi-mode transceiver module.

FIG. 14 shows details of the multi-mode transceiver module 52 illustrated in FIG. 6 according to an alternate embodiment of the multi-mode transceiver module 52. The multi-mode transceiver module 52 illustrated in FIG. 14 is intended to be used in conjunction with the multi-mode front-end module 50 illustrated in FIG. 7. The multi-mode transceiver module 52 includes the transceiver semiconductor die 144, which includes the transceiver circuitry 146, first active load circuitry 160, second active load circuitry 162, and up to and including $X^{TH}$ active load circuitry 164. The transceiver semiconductor die 144 further includes the down conversion circuitry 132, 134, 136 and the selectable impedance circuitry 148, 150, 152. The active load circuitry 160, 162, 164 presents a load to the LNA circuitry 78 (FIG. 7). The active load circuitry 160, 162, 164 may provide gain, which may be programmable. In an exemplary embodiment of the active load circuitry 160, 162, 164, the active load circuitry 160, 162, 164 includes complementary metal oxide semiconductor (CMOS) circuitry.

The first active load circuitry 160 receives the first common signal 54 and provides a first down conversion input signal 166 to the first down conversion circuitry 132 based on the first common signal 54. The second active load circuitry 162 receives the second common signal 58 and provides a second down conversion input signal 168 to the second down conversion circuitry 134 based on the second common signal 58. The $X^{TH}$ active load circuitry 164 receives the $X^{TH}$ common signal 62 and provides an $X^{TH}$ down conversion input signal 170 to the $X^{TH}$ down conversion circuitry 136 based on the $X^{TH}$ common signal 62. The down conversion circuitry 132, 134, 136 down converts the down conversion input signals 166, 168, 170 to provide a first selectable impedance input signal 172, a second selectable impedance input signal 174, and up to and including an $X^{TH}$ selectable impedance input signal 176 to the first, the second, and up to and including the $X^{TH}$ selectable impedance circuitry 148, 150, 152, respectively.

As previously mentioned, the selectable impedance circuitry 148, 150, 152 is used in conjunction with the down conversion circuitry 132, 134, 136. Each of the selectable impedance circuitry 148, 150, 152 presents an impedance to a corresponding down conversion circuitry 132, 134, 136. If the down conversion circuitry 132, 134, 136 includes passive conversion elements, such as passive mixers, the impedances presented to the down conversion circuitry 132, 134, 136 by the selectable impedance circuitry 148, 150, 152 may be translated from the IF domain to the RF domain at inputs to the down conversion circuitry 132, 134, 136. Therefore, the down conversion circuitry 132, 134, 136 may provide some RF filtering based on the presented impedances. The selectable impedance circuitry 148, 150, 152 provides the down converted signals 154, 156, 158 to the transceiver circuitry 146.

The transceiver circuitry 146 provides the RF transmit signals 56, 60, 64 to the PA module 66. Each of the down conversion input signals 166, 168, 170 may be either single-ended or differential. Each of the selectable impedance input signals 172, 174, 176 may be either single-ended or differential. In an alternate embodiment of the multi-mode transceiver module 52, the active load circuitry 160, 162, 164 is omitted. In an additional embodiment of the multi-mode transceiver module 52, the selectable impedance circuitry 148, 150, 152 is omitted. The multi-mode transceiver module 52 illustrated in FIG. 14 is an exemplary embodiment of the present disclosure and not intended to limit the scope of the present disclosure. Other embodiments of the multi-mode transceiver module 52 may omit any or all of the blocks shown in FIG. 14, may add other blocks, may modify any or all of the blocks shown in FIG. 14, or any combination thereof.

Figure 15:
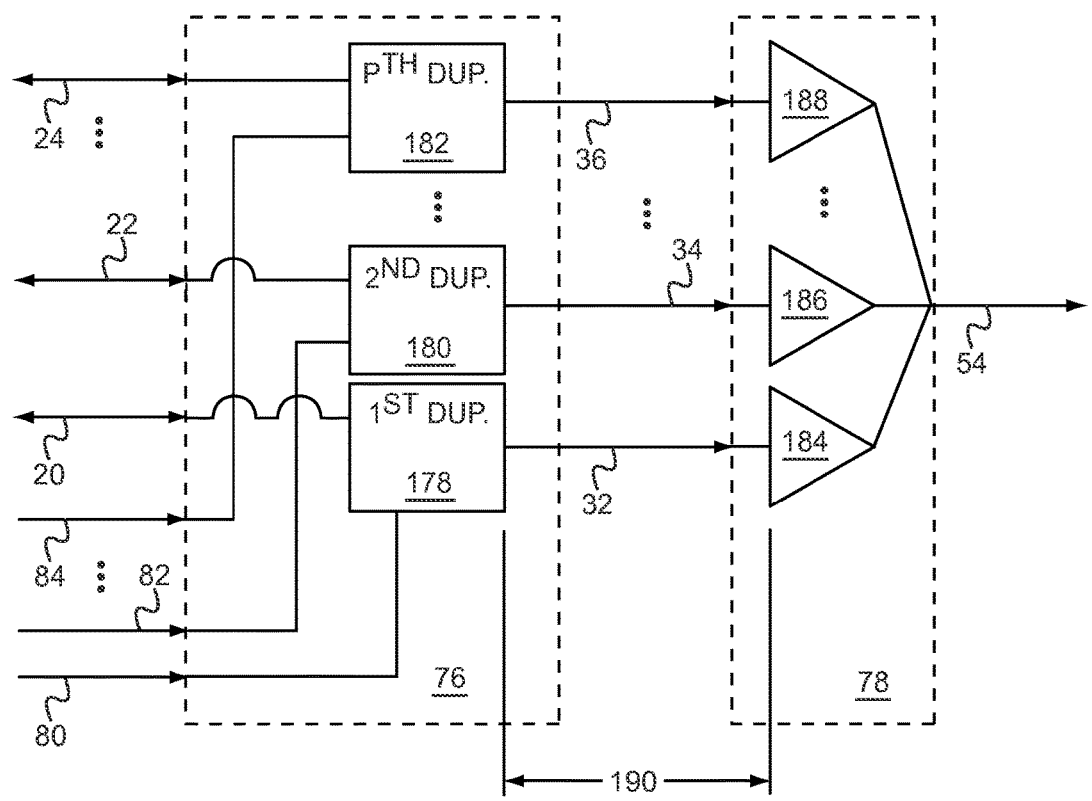
FIG. 15 shows details of RF filter circuitry and LNA circuitry illustrated in FIG. 7 according to one embodiment of the RF filter circuitry and the LNA circuitry.

FIG. 15 shows details of the RF filter circuitry 76 and the LNA circuitry 78 illustrated in FIG. 7 according to one embodiment of the RF filter circuitry 76 and the LNA circuitry 78, except the LNA circuitry 78 illustrated in FIG. 15 omits all of the common signals 54, 58, 62, except for the first common signal 54. The RF filter circuitry 76 includes a first duplexer 178, a second duplexer 180, and up to and including a $P^{TH}$ duplexer 182. The LNA circuitry 78 includes a first LNA 184, a second LNA 186, and up to and including a $P^{TH}$ LNA 188. The first duplexer 178 receives the first bi-directional RF signal 20 and provides the first RF receive signal 32 based on the first bi-directional RF signal 20 and a receive passband of the first duplexer 178. Additionally, the first duplexer 178 receives the first switched RF transmit signal 80 and provides the first bi-directional RF signal 20 based on the first switched RF transmit signal 80 and a transmit passband of the first duplexer 178.

The second duplexer 180 receives the second bi-directional RF signal 22 and provides the second RF receive signal 34 based on the second bi-directional RF signal 22 and a receive passband of the second duplexer 180. Additionally, the second duplexer 180 receives the second switched RF transmit signal 82 and provides the second bi-directional RF signal 22 based on the second switched RF transmit signal 82 and a transmit passband of the second duplexer 180. The $P^{TH}$ duplexer 182 receives the $M^{TH}$ bi-directional RF signal 24 and provides the $P^{TH}$ RF receive signal 36 based on the $M^{TH}$ bi-directional RF signal 24 and a receive passband of the $P^{TH}$ duplexer 182. Additionally, the $P^{TH}$ duplexer 182 receives the $Y^{TH}$ switched RF transmit signal 84 and provides the $M^{TH}$ bi-directional RF signal 24 based on the $Y^{TH}$ switched RF transmit signal 84 and a transmit passband of the $P^{TH}$ duplexer 182.

The first LNA 184 receives and amplifies the first RF receive signal 32 to provide the first common signal 54. The second LNA 186 receives and amplifies the second RF receive signal 34 to provide the first common signal 54. The $P^{TH}$ LNA 188 receives and amplifies the $P^{TH}$ RF receive signal 36 to provide the first common signal 54. The outputs of the LNAs 184, 186, 188 may be coupled together to provide the first common signal 54. Since the duplexers 178, 180, 182 and the LNAs 184, 186, 188 are provided by the same module, path lengths 190 between the duplexers 178, 180, 182 and the LNAs 184, 186, 188 may be fairly short, thereby minimizing interference, noise, and amplifier desense. Further, impedances of signal paths between the duplexers 178, 180, 182 and the LNAs 184, 186, 188 may be higher than in the traditional system. In a first exemplary embodiment of the multi-mode front-end module 50, impedances of signal paths between the duplexers 178, 180, 182 and the LNAs 184, 186, 188 may be greater than about 150 ohms. In a second exemplary embodiment of the multi-mode front-end module 50, impedances of signal paths between the duplexers 178, 180, 182 and the LNAs 184, 186, 188 may be greater than about 200 ohms. In a third exemplary embodiment of the multi-mode front-end module 50, impedances of signal paths between the duplexers 178, 180, 182 and the LNAs 184, 186, 188 may be greater than about 300 ohms.

In one embodiment of the RF filter circuitry 76, the RF filter circuitry 76 includes at least one surface acoustic wave (SAW) filter. In a first exemplary embodiment of the RF filter circuitry 76, P is equal to at least 10, such that the RF filter circuitry 76 includes at least 10 duplexers 178, 180, 182. In a second exemplary embodiment of the RF filter circuitry 76, P is equal to at least 20, such that the RF filter circuitry 76 includes at least 20 duplexers 178, 180, 182. In a third exemplary embodiment of the RF filter circuitry 76, P is equal to at least 30, such that the RF filter circuitry 76 includes at least 30 duplexers 178, 180, 182. In a fourth exemplary embodiment of the RF filter circuitry 76, P is equal to at least 40, such that the RF filter circuitry 76 includes at least 40 duplexers 178, 180, 182. In a first exemplary embodiment of the LNA circuitry 78, P is equal to at least 10, such that the LNA circuitry 78 includes at least 10 LNAs 184, 186, 188. In a second exemplary embodiment of the LNA circuitry 78, P is equal to at least 20, such that the LNA circuitry 78 includes at least 20 LNAs 184, 186, 188. In a third exemplary embodiment of the LNA circuitry 78, P is equal to at least 30, such that the LNA circuitry 78 includes at least 30 LNAs 184, 186, 188. In a fourth exemplary embodiment of the LNA circuitry 78, P is equal to at least 40, such that the LNA circuitry 78 includes at least 40 LNAs 184, 186, 188.

The number of RF communications bands supported by the LNA circuitry 78 and the RF filter circuitry 76 is at least as large as P. Therefore, the number of RF communications bands supported by the LNA circuitry 78 is equal to or greater than the number of LNAs 184, 186, 188 in the LNA circuitry 78. Also, the number of RF communications bands supported by the RF filter circuitry 76 is equal to or greater than the number of LNAs 184, 186, 188 in the LNA circuitry 78. The LNA circuitry 78 and the RF filter circuitry 76 illustrated in FIG. 15 is an exemplary embodiment of the present disclosure and not intended to limit the scope of the present disclosure. Other embodiments of the LNA circuitry 78 and the RF filter circuitry 76 may omit any or all of the blocks shown in FIG. 15, may add other blocks, may modify any or all of the blocks shown in FIG. 15, or any combination thereof.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, digital signal processors (DSPs), the like, or any combination thereof.

None of the embodiments of the present disclosure are intended to limit the scope of any other embodiment of the present disclosure. Any or all of any embodiment of the present disclosure may be combined with any or all of any other embodiment of the present disclosure to create new embodiments of the present disclosure.

Those skilled in the art will recognize improvements and modifications to the preferred embodiments of the present disclosure. All such improvements and modifications are considered within the scope of the concepts disclosed herein and the claims that follow.

What is claimed is:

1. A multi-mode radio frequency (RF) system comprising:
   a transceiver module configured to:
      receive a first common signal; and
      process baseband signals associated with a first plurality of RF communications bands based on the first common signal; and
   a front-end module comprising:
      a first plurality of RF filters, each associated with one or more of the first plurality of RF communications bands and configured to receive and filter an RF input signal to provide a filtered RF signal; and
      a first plurality of low noise amplifiers (LNAs) each configured to receive and amplify a filtered RF signal from one or more of the first plurality of RF filters to provide an amplified RF signal, wherein the amplified RF signal from each one of the first plurality of LNAs is combined to provide the first common signal; and
      a plurality of signal paths coupled between the first plurality of RF filters and the first plurality of LNAs, wherein an impedance of each one of the plurality of signal paths is greater than 150 Ohms.

2. The multi-mode RF system of claim 1 wherein the first plurality of RF filters is configured to be coupled to an RF antenna, which is used for transmitting and receiving wireless signals.

3. The multi-mode RF system of claim 2 further comprising the RF antenna.

4. The multi-mode RF system of claim 2 wherein the front-end module further comprises RF switch circuitry coupled between the first plurality of RF filters and the RF antenna.

5. The multi-mode RF system of claim 1 further comprising a power amplifier (PA) module coupled between the transceiver module and the front-end module.

6. The multi-mode RF system of claim 1 wherein:
   the transceiver module is further configured to:
      receive a first diversity common signal; and
      process baseband signals associated with the first plurality of RF communications bands based on the first diversity common signal; and
   the front-end module further comprises:
      a second plurality of RF filters, each associated with one or more of the first plurality of RF communications bands and configured to receive and filter a diversity RF input signal to provide a diversity filtered RF signal; and
      a second plurality of LNAs each configured to receive and amplify a diversity filtered RF signal from one or more of the second plurality of RF filters to provide a diversity amplified RF signal, wherein the diversity amplified RF signal from each one of the second plurality of LNAs is combined to provide the first diversity common signal.

7. The multi-mode RF system of claim 6 wherein the second plurality of RF filters is configured to be coupled to a diversity RF antenna, which is used for receiving wireless signals.

8. The multi-mode RF system of claim 7 further comprising the diversity RF antenna.

9. The multi-mode RF system of claim 7 wherein the front-end module further comprises diversity RF switch circuitry coupled between the second plurality of RF filters and the diversity RF antenna.

10. The multi-mode RF system of claim 1 wherein:

the transceiver module is further configured to:

receive a second common signal; and process baseband signals associated with a second plurality of RF communications bands based on the second common signal; and the front-end module further comprises:

a second plurality of RF filters, each associated with one or more of the second plurality of RF communications bands and configured to receive and filter an RF input signal to provide a filtered RF signal; and a second plurality of LNAs each configured to receive and amplify a filtered RF signal from one or more of the second plurality of RF filters to provide an amplified RF signal, wherein the amplified RF signal from each one of the second plurality of LNAs is combined to provide the second common signal.

11. The multi-mode RF system of claim 10 wherein each of the RF input signals associated with the first plurality of RF filters is a high band RF signal and each of the RF input signals associated with the second plurality of RF filters is a low band RF signal.

12. The multi-mode RF system of claim 11 wherein the first plurality of RF filters is configured to be coupled to an RF antenna and the second plurality of RF filters is coupled to the RF antenna, which is used for transmitting and receiving wireless signals.

13. The multi-mode RF system of claim 12 further comprising the RF antenna.

14. The multi-mode RF system of claim 12 wherein the front-end module further comprises high band RF switch circuitry and low band RF switch circuitry, such that the high band RF switch circuitry is coupled between the first plurality of RF filters and the RF antenna, and the low band RF switch circuitry is coupled between the second plurality of RF filters and the RF antenna.

15. The multi-mode RF system of claim 14 wherein the front-end module further comprises a diplexer, such that the diplexer is coupled between the high band RF switch circuitry and the RF antenna, and the diplexer is coupled between the low band RF switch circuitry and the RF antenna.

16. The multi-mode RF system of claim 11 wherein each high band RF signal has a frequency greater than about 1.7 gigahertz and each low band RF signal has a frequency less than about 1.7 gigahertz.

17. The multi-mode RF system of claim 11 wherein each high band RF signal has a frequency greater than about 1.4 gigahertz and each low band RF signal has a frequency less than about 1.4 gigahertz.

* * * * *